United States Patent Office
3,829,399
Patented Aug. 13, 1974

3,829,399
NOVEL POLYAMIDEIMIDE PRECURSORS AND HARDENABLE COMPOSITIONS CONTAINING THE SAME
Shigeyoshi Hara, Takeyoshi Yamada, and Tsunemasa Yoshida, Tokyo, Japan, assignors to Teijin Limited, Osaka, Japan
No Drawing. Filed Aug. 8, 1972, Ser. No. 278,803
Claims priority, application Japan, Aug. 12, 1971, 46/61,288; Sept. 20, 1971, 46/73,205, 46/73,206; Sept. 28, 1971, 46/75,604; Sept. 29, 1971, 46/76,191; Jan. 28, 1972, 47/10,311
Int. Cl. C08g 51/28, 51/34
U.S. Cl. 260—32.6 NT   21 Claims

ABSTRACT OF THE DISCLOSURE

An organic solvent-soluble polyamideimide precursor in which at least 50 mole percent of the total structural units are structural units having as the main chain an aromatic amideimide group expressed by the following formula (1)

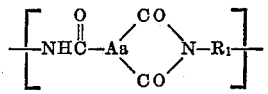

(1)

wherein Ar stands for an aromatic group, and $R_1$ is an organic radical having a valency of at least two, and at least 30 mole percent of the total terminal groups are carboxylic acid aryl ester groups. This precursor can give a hardened high polymer excellent in heat resistance when it is heated alone or together with a polyfunctional compound containing at least two reactive groups selected from hydroxyl (—OH) groups and primary and secondary amino group.

---

This invention relates to novel polyamideimide precursors, hardenable compositions containing these precursors and a process for preparing these precursors. More particularly, the invention relates to an organic solvent-soluble polyamideimide precursor in which at least 50 mole percent of the total structural units are structural units having as the main chain an aromatic amideimide group expressed by the following formula

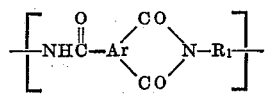

(1)

wherein Ar stands for an aromatic group, and $R_1$ is an organic radical having a valency of at least two, and at least 30 mole percent of the total terminal groups are carboxylic acid aryl ester groups, and it relates also to a hardenable composition containing such a polyamideimide precursor.

An object of this invention is to provide a novel precursor which can give a hardened high polymer excellent in heat resistance when it is heated alone or together with a polyfunctional compound containing at least two reactive groups selected from hydroxyl (—OH) groups and primary and secondary amino groups, and also a composition containing such a precursor.

Another object of this invention is to provide a precursor and a solid or liquid composition containing the precursor, which can be formed into a heat-resistant shaped structure, especially a heat-resistant film.

A further object of this invention is to provide a coating resin and a coating resinous composition which are excellent in heat resistance, chemical resistance and electrically insulating characteristics.

Still another object of this invention is to provide a novel process for preparing such precursors as mentioned above.

Other objects and advantages of this invention will be apparent from the following description.

Methods for preparing polyamideimides by reacting, for example, trimellitic acid or its reactive derivative with a diamine or diisocyanate, and methods for forming varnishes for heat-resistant films by dissolving such polyamideimides in suitable solvents have heretofore been known in the art.

Varnishes of these polyamideimides, however, are defective in that, as compared with the case of known polyester or polyamide varnishes, their handling is extremely difficult because of very low shaping workability, e.g., very poor wire-enamelling workability.

Accordingly, various attempts have been made to bring the workability of the polyamideimide varnish as close as possible to that of a varnish of the all-purpose type such as a polyester varnish while retaining as much as possible the good characteristics of the polyamideimide such as high resistance to hydrolysis (including resistance to alkalis), high resistance to thermal shock, high abrasion resistance and high thermal stability, and as a result varnishes of the polyamideimide ester type have been proposed.

However, in the case of polyamideimide esters, polyols which are used as curing agents must be added in great excess to obtain hardenable compositions, and in addition, the polyester component must be used in considerable excess over the polyamideimide component, or a resinous composition having sufficient hardenability cannot be obtained. Furthermore, these polyamideimide esters are defective in that an increase of the amount of the polyol or polyester component results in reduction of the thermal stability and chemical resistance in the resulting hardened product.

As a result of research made in this field, it has now been found that when a novel polyamideimide precursor in which at least 50 mole percent of the total structural units are aromatic amideimide structural units expressed by the following formula (1)

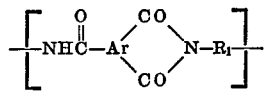

(1)

wherein Ar stands for an aromatic group and $R_1$ is an organic radical having a valency of at least two, and at least 30 mole percent of the total terminal groups are carboxylic acid aryl ester groups, and which has an inherent viscosity ([$\eta_{inh}$]) of 0.05 to 0.45 calculated from the value as measured at 30° C. as a solution of the polymer in N-methylpyrrolidone having a concentration of 0.5 g. polymer per 100 ml. of the solvent, is heated alone or together with a small amount of a polyfunctional compound containing at least two reactive groups selected from hydroxyl groups and primary and secondary amino groups, preferably in the presence of a catalyst, such polyamideimide precursor can readily be formed into a hardened shaped structure, for instance, a film because of a high reactivity of the terminal aryl ester group, and that the shaped structure such as a film which is obtained has a very excellent heat resistance.

In the above formula (1), $R_1$ is defined as an organic radical having a valency of at least two. Therefore, when $R_1$ has a valency of three, formula (1) may also indicate the following structural unit:

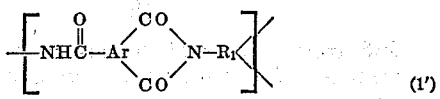
(1')

wherein $R_1$ is a trivalent organic radical.

While $R_1$ in the formula (1) is preferably selected from di-, tri- and tetra-valent organic radicals, it is especially preferred that the $R_1$ is a divalent organic radical or a combination of divalent and trivalent organic radicals.

The organic radical expressed by $R_1$ may be an aliphatic, alicyclic or aromatic organic radical, but it is preferred that at least 50 mole percent, especially at least 70 mole percent, of the total $R_1$ radicals contained in the precursor are aromatic organic radicals. Such aromatic organic radicals need not be fully aromatic ones made up only of aromatic nuclei but they may comprise lower aliphatic groups or atoms other than carbon. Examples of organic radicals suitable as $R_1$ are as follows:

Divalent Aromatic Radicals (1-1) 

(1-2) 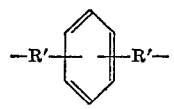

where R' is a lower alkylene group of 1 to 3 carbon atoms.

(1-3) 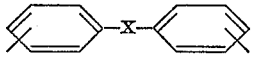

where X is a lower alkylene group of 1 to 4 carbon atoms or a group such as —O—, $$-SO_2- \text{ or } -\overset{O}{\underset{\|}{C}}-.$$

(1-4) 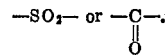

(1-5) 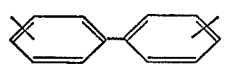

Divalent Aliphatic or Alicyclic Radicals (1-6) 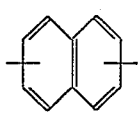

where $n$ is a number of from 2 to 12.

(1-7) 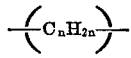

(1-8) 

where R' is as defined above.

(1-9) 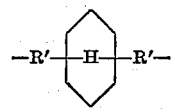

where R" is a divalent hydrocarbon residue having 1 to 3 carbon atoms.

Radicals Having Valency of Three or More (1-10) 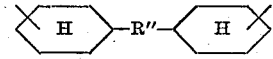

where $m$ is an integer of from 1 to 4.

(1-11) 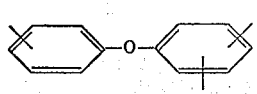

(1-12) 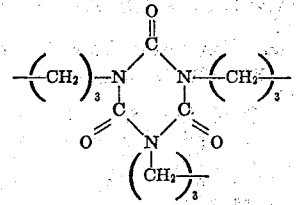

(1-13) 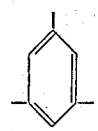

$R_1$ is, of course, not limited to those radicals exemplified above, but in short, $R_1$ may be any organic radical of a valency of two to four which is selected from diamines, triamines, diisocyanates, triisocyanates and tetraisocyanates, each being capable of reacting with an aromatic tricarboxylic acid of the following formula (1")

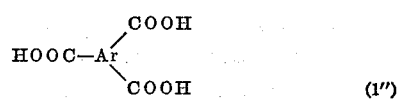
(1")

or its reactive derivative, e.g., a tricarboxylic anhydride expressed by the following formula

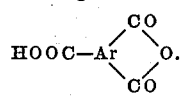

The group Ar in above formulas (1), (1') and (1") may be any aromatic group as long as it has a valency of three. Examples of groups suitable as Ar are as follows:

(2-1) 

(2-2) 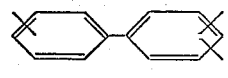

(2-3) 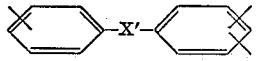

where X' is an alkylene group of 1 to 3 carbon atoms or a group such as $$-\overset{O}{\underset{\|}{C}}-,$$

$-SO_2$ or —O—.

(2-4) 

Of these aromatic groups, the trimellitic acid residue expressed by formula (2-1) is especially preferable as the aromatic group Ar.

In formulas (1), (1') and (1"), the three carboxyl (—COOH) and carbonyl

groups are bonded to the nuclear carbon atoms of the aromatic ring and two of such groups should be bonded to the nuclear carbon atoms at such a position that they may form a cyclic acid anhydride group

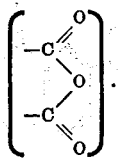

In the polyamideimide precursor of this invention, at least 50 mole percent of the total structural units are aromatic amideimide structural units expressed by formula (1).

The precursor, therefore, may be composed only of aromatic amideimide structural units of formula (1), or it may comprise up to 50 mole percent of other structural units. Any structural units that may form a copolymer with the aromatic amideimide units of formula (1) can be used as the structural units other than the aromatic amideimide structural units of formula (1). Preferable examples of such structural units are as follows:

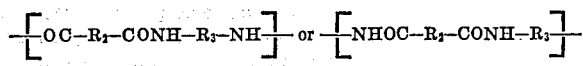

(2a)

(2b)

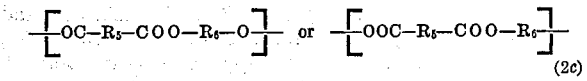

(2c)

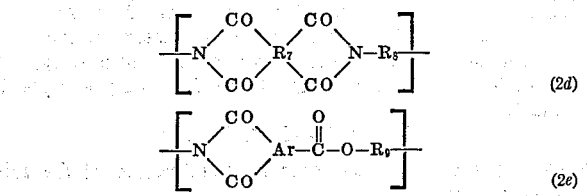

(2d)

(2e)

In the above formulas, $R_2$, $R_3$, $R_4$, $R_5$, $R_6$, $R_8$ and $R_9$ stand for an aliphatic or aromatic organic group having a valency of at least two, preferably a valency of two to four (in the above formulas 2a, 2b, 2c, 2d and 2e, those of a valency of two are shown as typical examples). In case these groups have a valency of three or four, they are bonded to other di- or trivalent organic groups through such groups as —CO—, —NH—, —O— or

as in the above formulas 2a, 2b, 2c, 2d and 2e. In the above formula (2e), Ar is as defined above.

The $R_7$ in the above formula (2d) is a tetravalent organic group, which may be either aliphatic, alicyclic or aromatic.

As $R_2$, $R_3$, $R_4$, $R_5$, $R_8$ and $R_9$ preferred, for example are, the groups illustrated as (1–1) to (1–13) hereinbefore for $R_1$. Aliphatic or alicyclic organic groups having a valency of two to four are especially preferred as $R_6$ and $R_9$, and as specific examples, polyol residues such as mentioned hereinbelow may be exemplified.

As preferable examples of $R_7$ tetravalent atomic groups having a structure such as (2–1), (2–2), (2–3) or (2–4) illustrated with respect to the group Ar, and aliphatic groups expressed by the following formula (3–1)

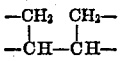

(3-1)

may be exemplified.

In each of the above formulas (1–1) to (1–13) and (2–1) to (2–4), the aromatic nucleus may be substituted by one or more non-reactive substituents such as hydrocarbon residues having 1 to 3 carbon atoms or halogen atoms.

In the aromatic polyamideimide precursor of this invention, at least 30 mole percent of the total terminal groups are (4–1) carboxylic acid aryl ester groups, the rest of the terminal groups being at least one selected from the group consisting of (4–2) cyclic carboxylic anhydride groups, (4–3) lower alkyl ester groups having up to 3 carbon atoms, (4–5) carboxyl groups, (4–6) carboxylic acid amide groups, (4–7) primary or secondary amino groups, (4–8) hydroxyl groups, (4–9) isocyanate groups, (4–10) carbamic acid ester groups (urethane groups) and (4–11) carbamic acid amide groups (urea groups). Of course, all of the terminal groups may be carboxylic aryl ester groups. In this invention, it is preferred that at least 40 mole percent, especially at least 50 mole percent, of the total terminal groups are carboxylic acid aryl ester groups.

The carboxylic acid aryl ester (4–1) may be expressed by the following formula (5)

wherein Ar' is a monovalent aromatic group which may be substituted by one or more substituents which are non-reactive to amidation and esterification, The group expressed by the formula Ar'—OOC— is bonded to a carbon atom, preferably that on the aromatic nucleus Ar of formula (1) or (1'). Since the aromatic polyamideimide precursor isolates an aromatic hydroxyl compound of the following formula (5')

when heated and hardened alone or together with the above-mentioned polyfunctional compound preferably in the presence of a catalyst, it is preferred that the carboxylic acid aryl ester of formula (5) is such that the aromatic hydroxyl compound of above formula (5') can readily be removed from the resulting hardened polymer under the hardening conditions.

Accordingly, carboxylic acid aryl esters of formula (5) where Ar' is a phenyl, cresyl, xylenyl, nitrophenyl, halogenophenyl, pyridyl or naphthyl group are convenient, and those where Ar' is a phenyl or cresyl group are especially preferred.

When terminal groups other than the carboxylic acid aryl ester groups (4–1) include terminal groups reactive with the carboxylic acid aryl ester groups, such as hydroxyl groups (4–8) or amino groups (4–7), and the average number of the terminal groups per precursor molecule is more than 2, preferably more than 2.5, the aromatic polyamideimide precursor of this invention is self-hardenable under heat (preferably in the presence of a catalyst). On the other hand, when terminal groups other than the carboxylic acid aryl esters consist mainly of groups non-reactive with the carboxylic acid aryl ester groups, such as the above exemplified groups (4–2) to (4–6) and (4–9) to (4–11), the precursor of this invention is converted to a hardened polymer when it is heated together with a polyfunctional compound containing at least two reactive groups selected from hydroxyl groups and amino groups, for example, polyols, polyamines and aminoalcohols.

In the polyamideimide precursor of this invention, if the terminal groups other than the carboxylic acid aryl ester group (4–1) are those non-reactive therewith, it is desired that at least 40 mole percent, especially at least 65 mole percent, of the total terminal groups are the carboxylic acid aryl ester groups. On the other hand, when the terminal carboxyl groups other than the carboxylic acid aryl ester groups (4–1) are those reactive therewith, such as hydroxyl or amino groups, especially alcoholic hydroxyl groups, if at least 30 mole percent, preferably at least 40 mole percent of the total terminal groups are the carboxylic acid aryl ester groups (4–1) and the average number of the terminal groups per precursor molecule is more than 2, preferably more than 2.5, the aromatic polyamideimide precursor can readily be converted to a hardened polymer when it is heated alone or together with a polyfunctional compound such as illustrated above.

In the aromatic polyamideimide precursor of this invention, the degree of polymerization or molecular weight is so adjusted that the inherent viscosity ($[\eta_{inh}]$) calculated from the value as measured at 30° C. as a solution of the polymer in N-methylpyrrolidone (solvent) having a concentration of 0.5 g. polymer per 100 ml. of the solution is within a range of from 0.05 to 0.45, preferably from 0.1 to 0.3, more preferably from 0.15 to 0.25.

Since the inherent viscosity $[\eta_{inh}]$ of the precursor of this invention is relatively low as mentioned above, the precursor generally has a relatively low softening point and its solubility in solvents is high. Further, even when the precursor of this invention is dissolved in a solvent at a relatively high concentration, the viscosity of the resulting solution is maintained at a relatively low level, and therefore, shaping operations such as a coating operation can be accomplished with ease. Further, since at least 30 mole percent, preferably at least 40 mole percent of the total terminal groups of the precursor of this invention are carboxylic acid aryl ester groups, these aryl ester terminal groups react readily with a polyfunctional compound such as mentioned above and/or with alcoholic hydroxyl and/or amino groups contained in the molecule of the precursor under heating conditions, thereby easily forming a hardened polymer of high quality. Thus, the precursor of this invention can readily be shaped to provide hardened shaped articles of an excellent heat resistance, such as a highly heat-resistant coating film or other shaped article.

As mentioned hereinabove, the principal structural unit of the precursor of this invention has an aromatic amide-imide linkage expressed by the following formula (1¹)

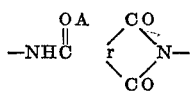
(1¹)

As such aromatic amideimide linkage, especially preferred is that of the trimellitic amideimide skeleton expressed by the following formula (1a′)

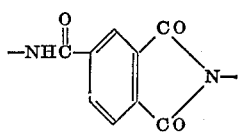
(1a′)

Accordingly, in accordance with a preferable embodiment of this invention an aromatic polyamideimide precursor consisting of the following units A, B and C is provided:

(1) units A having a linkage structure selected from the group consisting of an amideimide linkage expressed by the following formula

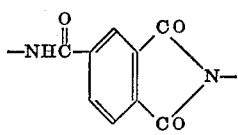

an amide linkage expressed by the formula —NHCO—,
an ester linkage expressed by the formula

a diimide linkage expressed by the following formula

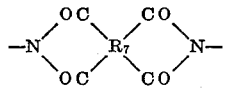

and an ester-imide linkage expressed by the following formula

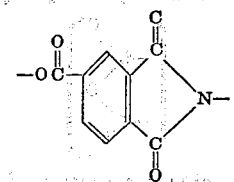

(2) units B being hydrocarbon residues having a valency of at least two which may have a bonding linkage other than those included in A above, containing atoms other than carbon; and (3) units C being terminal groups;

at least 50 mole percent of the units A being those having a structure of the amideimide linkage; the terminal groups C being atomic groups selected from the group consisting of carboxylic acid aryl ester groups, lower alkyl ester groups having up to 3 carbon atoms, cyclic carboxylic anhydride groups, carboxyl groups, carboxylic acid amide groups, primary and secondary amino groups, hydroxyl groups, isocyanate groups, carbamic acid groups (urethane groups) and carbamic acid amide groups (urea groups); and at least 30 mole percent of the terminal groups C being carboxylic acid aryl ester groups.

Linkage structures constituting units A have already been explained hereinabove as those expressed by formulas (2a), (2b), (2c), (2d) and (2e). Illustrations given hereinabove with regard to $R_1$ of formula (1′) and $R_2$, $R_3$, $R_4$, $R_5$, $R_6$, $R_7$, $R_8$ and $R_9$ of formulas (2a), (2b), (2c), (2d) and (2e) are also applicable to the units B. Also the terminal groups C are as explained above.

The aromatic polyamideimide precursor, which has been illustrated herein, can be prepared by employing, for example, starting materials of the following Recipes 1 and 2.

Recipe 1.—DAC Process

Component A: tricarboxylic monoanhydride of the following formula

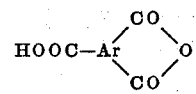

and/or its functional derivative
Component B: polyamine and/or polyisocyanate
Component C: diaryl carbonate (DAC)

In the process using the starting material of Recipe 1, the above three components A, B and C are indispensable components, but the starting material of Recipe 1 may further comprise, if necessary, one or more of the following optional components:

Component D: polycarboxylic acid and/or its functional derivative (exclusive of those included in component A above)
Component E: one or more members selected from polyols, aminohydroxyl compounds, aminocarboxylic acids and hydroxycarboxylic acids.

Recipe 2.—ATA Process

Component F: tricarboxylic monoanhydride monoaryl ester and/or its functional derivative
Component B: same as in Recipe 1

The starting material of Recipe 2 comprises the above components F and B as indispensable components, and it may further comprise, if necessary, the following optional components:

Component A: same as in Recipe 1
Component D: same as in Recipe 1
Component E: same as in Recipe 1
Component G: dicarboxylic acid monoaryl ester and/or its functional derivative.

In connection with the above combination of components, there are two exceptions; one being that when a polyamine is used as component B, the precursor of this invention cannot be prepared from component F and the polyisocyanate as component B, through this combination is included within the above illustration, and the other being that when a polyisocyanate is used as component B, the precursor of the invention can be prepared from the polyisocyanate as component B, and components A and G, though this combination is excluded from the above explanation.

Processes for Preparation of Polyamideimide Precursors of This Invention (1) Process Using Starting Material of Recipe 1: In the process using the starting material of Recipe 1, components A and B participate in formation of the main chain of the polyamideimide precursor, while component C not only plays the role of introducing the carboxylic acid aryl ester groups into the ends of the main chain but also exhibits an activity of promoting the amidation reaction between the carboxyl group of the component A and the amino group of component B.

Component A is a bifunctional compound and component B has two or more functional groups. The ratio of the amounts of components A and B used is determined depending on the inherent viscosity $[\eta_{inh}]$ of the polyamideimide precursor and the amount of the carboxylic aryl ester group to be introduced as the terminal group into the polyamideimide precursor. As described above, it is one of the important requirements of this invention that the carboxylic acid aryl ester groups occupy at least 30 mole percent, preferably at least 50 mole percent, of the total terminal groups. In order to satisfy this requirement component A is generally used in excess over component B.

It is presumed that component C reacts with the terminal carboxyl and amino groups of the precondensate or intermediate precursor formed by the reaction between components A and B in the following manner:

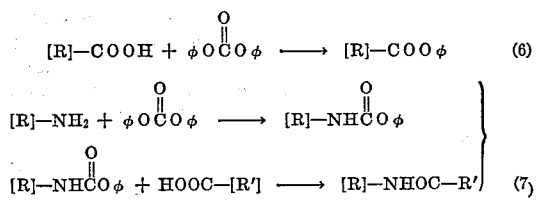

wherein $\phi$ stands for an aryl group and R and R' stand for the main chain of the precondensate or intermediate precursor formed by the reaction between components A and B.

The reaction (6) takes a role of introducing carboxylic acid aryl groups into the ends of the polyamideimide precursor of this invention, and the reaction (7) promotes formation of the main chain of the polyamideimide precursor while component C added to the reaction system is being consumed.

Accordingly, the amount of component C to be added to the reaction system is determined depending on the degree of advance of the reaction between components A and B at the time of addition of component C, the kinds of components A and B to be used and the reaction conditions to be adopted. Especially, when a polyamine is used as component B, it is necessary to add component C in an amount excessive over the amount corresponding with the amount of the carboxylic acid aryl ester to be directly introduced as the terminal group. From the stoichiometrical viewpoint, the amount of component C to be added should be equimolar to the remaining carboxyl groups in the reaction mixture at the time of addition, because by so doing a part of the remaining carboxyl groups can be allowed to act in forming amide linkages in the precursor in accordance with the reaction (7) and the rest of the remaining carboxyl groups can be allowed to act in forming the terminal carboxylic acid aryl ester groups of the polyamideimide precursor in accordance with the reaction (6).

In actual practice, however, component C need not be added in an amount equimolar to the remaining carboxyl groups, but the amount of component C to be added may be suitably increased or decreased. A suitable amount of component C may be determined experimentally.

In preparing the poyamideimide precursor of this invention according to the process using the starting material of Recipe 1, either or both of optional components D and E may be used along with above components A, B and C. In such case, component D reacts with component B to introduce other structural units bonded to the amide and/or imide linkages in the main chain of the precursor. When a polyol is used as component E, it reacts with component A to introduce ester structural units into the precursor. Further, when an aminohydroxyl compound, aminocarboxylic acid or hydroxycarboxylic acid is used as component E, such compound reacts with component A and/or component B to introduce structural units, other than those derived from components A and B, bonded by the amide or imide linkages in the main chain of the precursor.

By the conjoint use of component D and/or component E, it is thus possible to modify and improve in various ways the physical and chemical properties of a hardened polymer derived from the polyamideimide precursor prepared from components A, B and C depending on the intended use of the final hardened polymer product. Further, a suitable branched structure can be given to the precursor by employing suitable amounts of compounds having a valency of three or more as component D and/or component E. Furthermore, it is possible to obtain a self-hardenable precursor containing a sufficient amount of alcoholic hydroxyl groups and/or free amino groups by selecting apropriate reaction conditions.

However, in the polyamideimide precursor of this invention, since it is essential that amideimide structural units expressed by above formula (1) should occupy at least 50 mole percent, preferably at least 70 mole percent, of the total structural units, the amount of component D and/or component E used should be equimolar to component A or less. It is preferred that the amount of component D and/or component E used is not more than 3/7 mole per mole of the component A.

(2) Process Using Starting Material of Recipe 2: The process using the starting material of Recipe 2 includes several embodiments described below, but all of these embodiments are in common in the point that at least the component F and/or the comopnent G is used for introduction of carboxylic acid aryl ester groups as terminal groups in the resulting polyamideimide precursor. The most typical embodiment of the process using the starting material of Recipe 2 comprises reacting component F (a tricarboxylic monoanhydride monoaryl ester and/or its functional derivative) with a polyamide included in component B (which will be referred to as "component B–1" hereinbelow) to thereby form a precursor of this invention in which at least 30 mole percent, preferably at least 50 mole percent, of the total terminal groups are carboxylic acid aryl ester groups. In this embodiment, by adding suitable amounts of component D and/or component E as described with respect to the process using the starting material of Recipe 1, it is possible to obtain the intended polyamideimide precursor in the modified form (see process ATA–1 decribed hereinbelow).

When a polyisocyanate is used as component B (which will be referred to as "component B–2" hereinbelow), since it is difficult to form an amide linkage by reacting component B–2 with the carboxylic acid aryl ester group, the above-mentioned tricarboxylic monoanhydride (or its functional derivative), namely component A, and the polyisocyanate (component B-2) are used for formation of the main chain of the polyamideimide precursor, and component F (tricarboxylic monoanhydride monoaryl ester of its functional derivative) and/or component G (dicarboxylic acid monoaryl ester or its functional derivative) are used for formation of terminal carboxylic acid aryl ester groups. By doing so it is possible to easily obtain a polyamideimide precursor of this invention in which at least 30 mole percent, preferably 50 mole percent, of the total terminal groups are carboxylic acid aryl groups. Of course, also in this embodiment a suitable amount of the polycarboxylic acid of component D may be added to the reaction system (see process ATA-3 described below). In accordance with this embodiment of the process using the starting material of Recipe 2, it is possible to easily introduce desired amounts of carboxylic acid aryl esters uniformly in the intended polyamideimide precursor. Therefore, this embodiment is advantageous.

In another embodiment of the process employing the starting material of Recipe 2, from the tricarboxylic acid monoanhydride and/or its functional derivative (component A) and a polyamine and/or a polyisocyanate (component B) an intermediate polycondensate is formed in which preferably at least 50 mole percent of the total terminal groups are amino groups, and the so formed polycondensate is further reacted with the component F or the component F and component B-2 (polyisocyanate), to thereby obtain a polyamideimide precursor of this invention. In this embodiment, addition of the above reactants may be effected in any order, and if desired, component D is further added in a suitable amount and allowed to participate in the reaction (see processes ATA-2 and ATA-4 described below).

Each of the above processes of Recipe 1 and of Recipe 2 will now be illustrated in more detail.

Aromatic polyamideimide precursors of this invention may be prepared in accordance with the above-mentioned DAC process (Recipe 1) and ATC process (Recipe 2), and preferable embodiments of these processes will now be illustrated. The precursors of this invention, however, are not limited by these embodiments but all of the precursors meeting the requirements desribed above are included in the scope of this invention.

Process DAC-1

A tricarboxylic monoanhydride and/or its functional derivative (component A) and a polyamine (component B) are heated and reacted in such amounts that the total amount of carboxyl groups and acid anhydride groups (inclusive of their functional derivative groups) is almost equimolar to the amount of amine groups, or more than the equimolar amount. Then, the resulting low condensate is reacted with a diaryl carbonate (component C).

Information of the precondensate, it is possible to add a polycarboxylic acid and/or its functional derivative (component D), and it is also possible to add a polyol, an aminohydroxyl compound, an aminocarboxylic acid or a hydroxycarboxylic acid (component E). Of course, conjoint addition of components D and E is also possible.

Process DAC-2

A tricarboxylic monoanhydride and/or its functional derivative (component A) and a polyisocyanate or a polyisocyanate and a polyamine (component B) are heated and reacted in such amounts that the total amount of carboxyl groups (inclusive of functional derivative groups thereof) and acid anhydride groups (inclusive of functional derivative groups thereof) is almost equimolar to the amount of isocyanate and amino groups, or more than the equimolar amount, to thereby obtain a precondensate, and then the precondensate is reacted with a diaryl carbonate (component C).

In formation of a precondensate such as mentioned above, it is possible to add, according to need, a polycarboxylic acid and/or a functional derivative thereof (component D), and it is also possible to add a polyol, an aminohydroxyl compound, an aminocarboxylic acid or a hydroxycarboxylic acid (component E). Of course, conjoint addition of components D and E is also possible.

Process ATA-1

In accordance with this process, a polyamine (component B) is reacted with a tricarboxylic monoanhydride monoaryl ester and/or its functional derivative at such a ratio that the total amount of carboxyl groups (inclusive of functional derivative groups thereof) and acid anhydride groups (inclusive of functional derivative groups thereof) of component F is almost equimolar to, preferably excessive over, the amount of amino groups of component B.

In conducting the above reaction, if desired, a polycarboxylic acid and/or its functional derivative (component D) may be added, and it is also possible to add a polyol, an aminohydroxyl compound, an aminocarboxylic acid, a hydroxycarboxylic acid and/or a functional derivative thereof (component E).

When a polyol and/or an aminohydroxyl compound is used in a suitable amount as component E, a precursor containing alcoholic hydroxyl terminal groups is obtained, while the polyol is left unreacted as described below. The resulting composition is used as a self-hardenable composition as it is.

Process ATA-2

A tricarboxylic monoanhydride and/or its functional derivative (component A) and a polyamine (component B-1) are reacted at such a ratio that the number of amino groups is not smaller than the total number of carboxyl groups (inclusive of functional derivative groups thereof) and acid anhydride groups (inclusive of functional derivative groups thereof) but not greater than two times the total number of the carboxyl and acid anhydride groups. It is preferred that the number of amino groups is 1.1 – 1.6 times the total number of the carboxyl and acid anhydride groups. By this reaction a precondensate (P) is formed in which a majority of terminal functional groups are amino groups. Then, this precondensate (P) is reacted with a tricarboxylic monanhydride aryl ester and/or its functional derivative (component F).

In preparing the above precondensate, if desired, a polycarboxylic acid and/or its functional derivative (component D) may be added. The reaction between the low condensate (P) and the component F (tricarboxylic acid monoanhydride monoaryl ester is preferably conducted by employing component F in an amount at least equimolar to the terminal amino groups of the precondensate (P), whereby a precursor having an excellent hardenability can be obtained.

Process ATA-3

A polyisocyanate (component B-2) is reacted with a tricarboxylic acid monoanhydride (component A) and a dicarboxylic acid monoaryl ester (component G) and/or a tricarboxylic monoanhydride monoaryl ester (component F), to thereby form an aromatic polyamideimide precursor in which at least 30 mole percent, preferably at least 50 mole percent, of the terminal groups are carboxylic acid aryl ester groups. In this reaction, if desired, a polycarboxylic acid (component D) may be added to the reaction system.

It is possible to add components A and B-2 along with component F and/or component G to cause the reaction among them. Alternatively, component A is allowed to react with component B-2 in advance, and the resulting isocyanate-terminated low condensate is then reacted with component F and/or component G.

Process ATA-4

In this process, a tricarboxylic monoanhydride and/or its functional derivative (component A) and a tricarboxylic monoanhydride monoaryl ester and/or its functional derivative (component F) are reacted with a polyamine and a polyisocyanate (component B).

In this case, component A is reacted with the polyamine at such a ratio that the number of amino groups of component B is 0.6-1.8 times the number of the sum of carboxyl groups and acid anhydride groups of component A, to thereby obtain a precondensate (Q). Then, the precondensate (Q) is reacted with component F and the polyisocyanate at such a ratio that the amount of component F is substantially equimolar to the terminal amino groups of the low condensate (Q) and the isocyanate groups of the polyisocyanate correspond substantially with the carboxyl groups in the precondensate (Q). As a result, a polyamideimide precursor is obtained in which the terminal groups are substantially occupied by aryl ester groups.

Such sequence of the reaction that component F is added to the precondensate (Q) to form an imide group by the reaction between the acid anhydride and amino groups and after removal of water formed as by-product in the above reaction, the polyisocyanate is added to allow it to react with the carboxyl group in the precondensate (Q), may be adopted. Furthermore, a polyamideimide precursor may similarly be formed by adopting such a reaction sequence that the polyisocyanate is first reacted with the precondensate (Q) and then component F is reacted therewith.

Especially in the latter case, the polyisocyanate added is reacted with the terminal amino group at first, but at temperatures higher than 150° C. the so formed urea group is decomposed and the isocyanate group formed again is reacted with the carboyxl group to form an amide group, with the result that the terminal carboxyl groups are consumed and the remaining terminal amino groups are reacted with component F added afterwards.

Of above-mentioned several embodiments of the process of preparing polyamideimide precursors of this invention, processes DAC-1, DAC-2, and ATA-1 are advantageous, when the reaction is carried out in a phenolic solvent such as phenol and cresol, because a phenol formed as a by-product during the reaction is mixed with the reaction solvent of the same series and the by-product can be utilized conveniently as the solvent. Further, the so-formed by-product does not decrease the solubility of the resulting polyamideimide precursor in the solvent; therefore, the resulting polyamideimide precursor in the as-obtained form, i.e., the solvent solution form, may be conveniently used as a shaping solution for coating, especially as a baking varnish for wire-coating, if necessary, after incorporation of a polyol and/or an aminoalcohol.

When an amide type solvent such as N-methylpyrrolidone, N,N-dimethylacetamide or dimethylformamide is preferable to a phenolic solvent as a main solvent for the shaping composition, it is advantageous to conduct the preparation of the precursor according to the above-mentioned processes ATA-2, ATA-3, and ATA-4 by employing an amide type solvent such as mentioned above as a reaction medium, because in these processes no phenol is formed as a by-product, the amounts of expensive components G and F are small and the as-obtained solution may be directly used as a shaping composition without separation of the precursor. Especially, in the case of process ATA-3, the polyamideimide precursor can be formed under mild reaction conditions, and therefore, in such case, process ATA-3 is especially advantageous.

Aromatic polyamideimide precursors of this invention may be prepared by the above-mentioned various processes. Components A to G to be used in these processes will now be illustrated in more detail.

Component A

As component A, tricarboxylic monoanhydrides expressed by the following general formula

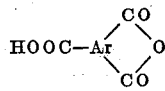

wherein Ar is a trivalent aromatic group, and functional derivatives thereof may be used. Any of the functional derivatives that can exhibit reactivity equivalent to that of the tricarboxylic monoanhydride may be used. For instance, compounds expressed by the following general formula (i) or (ii)

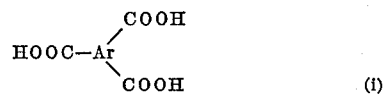 (i)

or

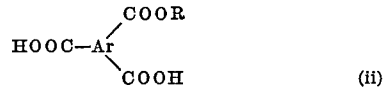 (ii)

wherein Ar is as defined above, and R is a lower alkyl group, may be used.

Specific examples of component A are trimellitic anhydride, 3,4,4'-diphenylmethane-tricarboxylic anhydride, 3,4,4' - diphenylether - tricarboxylic anhydride, 3,4,4'-diphenylsulfone-tricarboxylic anhydride, 3,4,4'-benzophenone-tricarboxylic anhydride, 1,2,4 - naphthalene-tricarboxylic anhydride, 1,4,5 - naphthalene - tricarboxylic anhydride, 2,3,6-naphthalene-tricarboxylic anhydride, 2,3,5-pyridine-tricarboxylic anhydride, and functional derivatives of these tricarboxylic anhydrides. They may be employed singly, or in the form of a mixture of two or more of them. Among these compounds, trimellitic acid and its anhydride are especially preferred.

Component B

As component B polyamines and/or polyisocyanates are used. Aliphatic, alicyclic and aromatic diamines, triamines and tetramines are used as the polyamine. Specific examples of the polamine to be used as component B are aliphatic polyamines of 2 to 15 carbon atoms such as ethylenediamine, tetramethylenediamine, hexamethylenediamine, octamethyleneediamine, decamethylenediamine and xylylenediamine, alicyclic polyamines such as 1,4 - cyclohexylenediamine, 2,2 - propane-bis-4,4'-cyclohexylenediamine

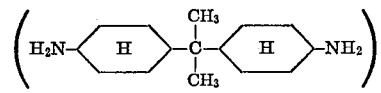

and 1,4-bis-(aminomethyl)-cyclohexane

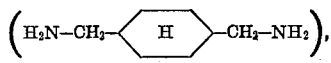, aromatic diamines such as para-phenylenediamine, meta-phenylenediamine, amines expressed by the formula

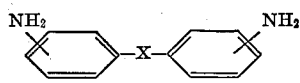

in which X is selected from —O—, —SO$_2$—,

and an alkylene group of 1 - 4 carbon atoms), 1,5-diaminonaphthalene, and polyamines having a functionality of three or more such as tris-(γ-aminopropy)-isocyanate, tris - (4 - aminophenyl) - methane, polymethylene-polyphenylene-polyamines and 2,4,4-triaminodiphenyl ether. These aromatic polyamines may have non-reactive substituents such as lower alkyl groups, lower alkoxy groups and halogen atoms.

As the polyisocyanate component aliphatic, alicyclic and aromatic, diisocyanates, triisocyanates may be employed and tetraisocyanates. Preferable examples of the polyisocyanate to be used in this invention are aliphatic diisocyanates such as hexamethylenediisocyanate, heptamethylenediisocyanate and lysine ester diisocyanate, alicyclic diisocyanates such as 1,4-dimethylcyclohexane-, ω,ω'-diisocyanate, cyclohexane-1,3-diisocyanate, cyclohexane-1,4-diisocyanate and dicyclohexylmethane-4,4'-diisocyanates, aromatic diisocyanates such as m-phenylenediisocyanate, p-phenylenediisocyanate, 4,4'-biphenylenediisocyanate, 1,5 - naphthalenediisocyanate, 4,4' - diphenylmethane-diisocyanate, 4,4' - diphenyletherdiisocyanate, 4,4'-diphenylsulfone-diisocyanate and 3,3'-diphenylsulfonediisocyanate, and aromatic diisocyanates having substituents which are nonreactive under the reaction conditions, e.g., alkyl groups, alkoxy groups and halogen atoms, such as toluylenediisocyanate, 3,3'-methoxy-biphenyl-4,4'-diisocyanate and 3,3'-dimethyl-biphenyl-4,4'-diisocyanate. It is possible to employ aliphatic-aromatic diisocyanates such as m-xylenediisocyanate and p-xylylenediisocyanate. In addition to diisocyanates such as exemplified above, isocyanates having a functionality of three or more, e.g., triisocyanates and tetraisocyanates, such as triphenylenemethane-triisocyanate, polymethylene-polyphenylenepolyisocyanates, tris-(isocyanatophenyl)-phosphate, 2,4,4'-diphenylethertriisocyanate, tris-(4-methyl - 3 - isocyanatophenyl)-isocyanurate and 4,4'-dimethyldiphenylmethane-2,2',5,5'-tetraisocyanate may be employed.

These isocyanates may be used in the form of a so-called "stabilized isocyanate or isocyanate generator," for instance, in the form of an adduct (urethane group) with a phenol or alcohol.

Component C

Any of the diaryl carbonates that can form carboxylic acid aryl ester groups at the ends of the polyamideimide precursor of this invention may be used. Examples of such diaryl carbonate are diphenyl carbonate, dicresyl carbonate, dinaphthylcarbonate, bis - (2 - chlorophenyl) carbonate and the like.

Component D

Polycarboxylic acids and functional derivatives thereof are used as component D in this invention. Dicarboxylic acids, tricarboxylic acids other than those used as component A, tetracarboxylic acids and functional derivatives of these acids are preferably used. These acids may be either aliphatic, alicyclic or aromatic.

Specific examples of dicarboxylic acids are aliphatic dicarboxylic acids such as adipic acid and sebacic acid, alicyclic dicarboxylic acids such as 1,4-cyclohexane dicarboxylic acid, and aromatic dicarboxylic acids such as terephthalic acid, isophthalic acid, isocinchomeronic acid, dinicotinic acid, 1,5-naphthale-dicarboxylic acid, 2,6-naphthalene-dicarboxylic acid and 2,7-naphthalene-dicarboxylic acid. These aromatic dicarboxylic acids may contain on the aromatic nucleus non-reactive substituents such as alkyl groups, alkoxy groups and halogen atoms. Furthermore, dicarboxylic acids which contain an imide group, such as those expressed by the following general formulas (i) to (iii) may be used:

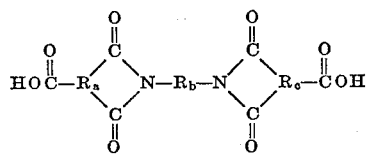

(i)

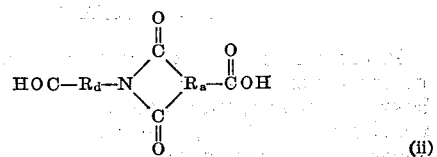

(ii)

and

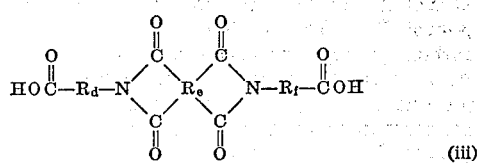

(iii)

wherein $R_b$, $R_d$ and $R_f$ stand for a divalent organic group, $R_a$ and $R_c$ stand for a trivalent organic group, and $R_e$ designates a tetravalent organic group.

In addition to dicarboxylic acids such as exemplified above, tricarboxylic acids such as trimesic acid and tri-(β-carboxyethyl)-isocyanurate, and tetracarboxylic dianhydrides such as pyromellitic dianhydride, butanetetracarboxylic dianhydride, naphthalenetetracarboxylic dianhydride, 3,3',4,4'-benzophenone-tetracarboxylic dianhydride and 3,3',4,4'-diphenylsulfone-tetracarboxylic dianhydride may be employed.

Not only various polycarboxylic acids exemplified above but also their functional derivatives may be used as component D in this invention. Any of the functional derivatives of polycarboxylic acids that can exhibit under the reaction conditions reactivity equivalent to that of the polycarboxylic acids, may be used. For instance, lower alkyl esters and aryl esters of such polycarboxylic acids as mentioned above, and hydrolysis products or lower alkyl-esterified products of such tetracarboxylic acids dianhydrides as mentioned above may be employed.

Of the various polycarboxylic acids and their functional derivatives exemplified above, those that are aromatic are especially preferred.

Component E

Polyols, aminohydroxyl compounds, aminocarboxylic acids and hydroxycarboxylic acids are used as component E in this invention. Preferable examples of compounds to be used as component E are follows:

(a) Polyols

Glycols such as ethylene glycol, propylene glycol, tetramethylene glycol, neopentyl glycol, 1,4-cyclohexene-dimethanol and bis-(β-hydroxyethyl) terephthalate, polyols having a functionality of two or more, such as glycerine, trimethylol-ethane, trimethylol-propane, 1,2,6-hexanetriol, tris-(β-hydroxyethyl) isocyanurate, pentaerythritol and sorbitol, low-molecular-weight polyesters which have more than two terminal hydroxyl groups per molecule and which are obtained by reacting a polycarboxylic acid (or its ester) with excess of a polyol, and partially polymerized epoxy resins and phenoxy resins.

(b) Aminohydroxyl Compounds

Aminoalcohols such as ethanol amine, propanol amine, aminobutane-2-ol, 2-amino-propane-1,3-diol, 1-aminopropane - 2,3 - diol, 2-amino-2-methyl-propane-1,3-diol, tris-(hydroxymethyl)-amino-methane, 1 - amino-2,2-bis-(hydroxymethyl)-propane-3-ol, etc.

(c) Aminocarboxylic Acids

Aliphatic aminocarboxylic acids such as aminovaleric acid, aminocaproic acid and β-alanine, and aromatic aminocarboxylic acids such as m-aminobenzoic acid, p-aminobenzoic acid, aminonaphthoic acid and 4-amino-4'-carboxydiphenyl-ether.

(d) Hydroxycarboxylic Acids

Such hydroxycarboxylic acids as ε-hydroxycaproic acid, β-hydroxyethyl - 4 - carboxyphenyl-ether and N-(2,3-dihydroxypropyl)-trimellitimide.

Component F

As the tricarboxylic monoanhydride monoaryl ester or its functional derivative to be used as component F in this invention, aryl esters of tricarboxylic monoanhydrides and their functional derivatives such as mentioned as component A hereinbefore are preferred. These aryl esters are expressed by the following general formula

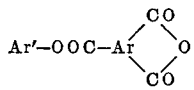

wherein Ar is a trivalent aromatic group, and Ar' is a monovalent aromatic group.

Specific examples of such aryl ester are phenyl, cresyl, xylenyl, nitrophenyl, halogenophenyl, pyridyl and naphthyl esters of such tricarboxylic monoanhydrides as trimellitic anhydride, 3,4,4'-benzophenonetricarboxylic anhydride, 1,2,4-naphthalene-tricarboxylic anhydride, 1,4,5-naphthalene-tricarboxylic anhydride, 2,3,6 - naphthalene-tricarboxylic anhydride and 2,3,5-pyridine-tricarboxylic anhydride. Among these esters, phenyl and cresyl esters of trimellitic anhydride are especially preferred.

Functional derivatives of these tricarboxylic monoanhydride monoaryl esters where the acid anhydride group is hydrolyzed or esterified with lower alcohols may also be used as component F in this invention.

Component G

As the dicarboxylic acid monoaryl ester to be used as component G in this invention, monoaryl esters of such dicarboxylic acids as exemplified above with respect to component D may be mentioned.

Especially preferred are monoaryl esters of aromatic dicarboxylic acids exemplified above with respect to component D, such as terephthalic acid, isophthalic acid, naphthalene - dicarboxylic acids, diphenylsulfone - dicarboxylic acids, diphenylether-dicarboxylic acids and biphenyl-dicarboxylic acids, and monoaryl esters of aromatic imide-dicarboxylic acids such, for example, as 4-hydroxycarbonyl-N-(3- or 4-carboxyphenyl) phthalimide, N-(3- or 4-hydroxycarbonylphenyl) trimellitimide, etc.

As the aryl component of the dicarboxylic acid monoaryl ester to be used as component G, phenyl, cresyl, pyridyl and naphthyl esters are preferred. Especially preferred are phenyl and cresyl esters.

In preparing polyamideimide precursors of this invention according to various processes explained hereinabove, use of a solvent is not always necessary, but since in many cases the resulting precursor has a high melting point and practice of melt polycondensation is difficult, it is generally preferable to conduct the preparation of the polyamideimide precursor in the presence of a suitable organic solvent. Any of the organic solvents that are so inert as not to cause a side reaction and are stable liquids under the reaction conditions may be employed. Use of such solvents that have a boiling point higher than 150° C., that can dissolve therein the resulting polyamideimide precursor and that can readily be removed on separation of the polyamideimide precursor or on hardening of the composition, is especially preferred. Examples of such preferable solvents are as follows:

(1) Disubstituted amides such as N-methylpyrrolidone, N,N-dimethylacetamide, dimethylformamide, tetramethylurea, hexamethylphosphoramide, etc.

(2) Sulfones and sulfoxides such as dimethylsulfoxide, dimethylsulfone, tetramethylenesulfone, etc.

(3) Ethers and esters such as ethylene glycol monomethyl ether acetate, butyl acetate, anisole, o-nitro-anisole, etc.

(4) Ketones such as acetophenone, etc.

(5) Halogenated hydrocarbons such as monochlorobenzene, dichlorobenzene, etc.

(6) Aromatic hydrocarbons and nitrated compounds thereof such as nitrobenzene, nitrotoluene, cymene, biphenyl, diphenyl ethers, etc.

(7) Phenols such as phenol, cresol, xylenol, etc.

When the resulting polyamideimide precursor is used in the as-obtained form, namely in the form of an as-obtained solution without separation of the precursor from the solvent, the solvent is chosen appropriately depending on requirements for uses to which such as-obtained solution of the polyamideimide precursor is applied.

Among the solvents mentioned above, disubstituted amides (1), sulfones and sulfoxides (2) and phenols (7) are especially preferred because they dissolve the polyamideimide precursor quite well and can be easily removed therefrom.

The amount of the solvent used varies depending on the recipe of the starting material, the kind of the solvent, structure of the precursor and other factors, but in general, the solvent is used in such an amount that the concentration of the precursor will be 20 to 95 percent by weight. Since process ATA–1 or ATA–3 can be performed under mild reaction temperature conditions, in such process the concentration of the precursor may be comparatively low. In processes DAC–1, DAC–2 and ATA–2, it is commonly desired that the reaction is carried out at the possible highest precursor concentration as long as other conditions such as stirring permit and that the reaction temperature is maintained at a high level even under atmospheric pressure.

The concentration of the reaction mixture need not be kept constant throughout the reaction, but it may optionally be diluted or condensed during the reaction.

The presence of a catalyst is not always necessary to prepare the polyamideimide precursor of this invention, but in some cases, the reaction can be promoted effectively by employing a catalyst.

As such catalyst, oxides, hydroxides, organic acid salts, alcoholates and organic complexes of alkali metals such as lithium, sodium and potassium, alkaline earth metals such as magnesium, calcium and strontium, and other metals such as titanium, zirconium, tin, lead, zinc, cobalt, manganese, antimony, bismuth, germanium and silicon may be exemplified. Organic amines such as tertiary amines and quaternary ammonium salts may also be employed.

Use of a catalyst is especially effective in embodiments where a diaryl carbonate is used or an isocyanate is used in combination with a phenolic solvent. Catalysts such as exemplified above are also effective for esterification and ester-exchange reaction while they are less effective for the amidation between amino groups and carboxyl or ester groups. Thus, the following care must be taken when these catalysts are used for formation of the polyamideimide precursor of this invention.

For instance, when the formation of the polyamideimide precursor is conducted according to process ATA–1 by employing the tricarboxylic monoanhydride monoaryl ester, diamine and polyol as starting materials, since in the absence of a catalyst the amino group has a higher reactivity with the aryl ester and acid anhydride groups than the hydroxy group, at first only the diamine participates in the reaction in the absence of a catalyst, resulting in formation of a precursor composed mainly of the amide-imide structural units even when all of the above reactants are present at the start of the reaction. Then, the resulting precursor is reacted with the remaining hydroxyl groups of the triol to thereby accomplish hardening. On the other hand, when a catalyst is present at the start of the reaction, since the reaction between the aryl ester groups and the hydroxyl groups of the triol is accelerated, the cross-linking by the ester linkage is more likely to occur than the formation of the intended soluble polyamideimide precursor. Accordingly, in the preparation of the polyamideimide precursor is carried out by employing the above-mentioned combination of reactants, it is not preferred that a catalyst be present from the start of the reaction, but it is desired that addition of a catalyst is effected at the time when the polyamideimide precursor is formed in the reaction mixture and the reaction is terminated prior to occurrence of cross-linking reaction, whereby a precursor composition excellent in hardenability can be obtained.

Preferable amounts of the catalyst to be used vary depending on the recipe of the starting material, the preparation process, the reaction conditions and other factors, but the catalyst is generally used in an amount of 0.005 to 15% by weight based on the polyamideimide precursor.

In preparing polyamideimide precursors of this invention, the reaction temperature varies depending on the preparation process, the kind of solvent to be used and other factors, but in general, the reaction is carried out at temperatures ranging from 100° C. to 300° C. In the case of processes DAC-1, DAC-2, ATA-1, ATA-2 and ATA-3, it is preferable to carry out the reaction at 150 to 260° C., and in the case of process ATA-3, it is preferable to carry out the reaction at 100 to 200° C. The reaction temperature need not be maintained at a constant level throughout the reaction, but optimum temperatures are adopted to each stage of the reaction. Such optimum temperatures can easily be determined based on experiments in view of the reaction efficiency and control of occurrence of side reactions.

When the polyamideimide precursor is partially reacted with a polyfunctional compound according to procedures mentioned below, temperatures ranging from 80 to 200° C. are generally adopted for such partial reaction.

Shaping Composition Comprising Polyamideimide Precursor

Polyamideimide precursors (X) of this invention prepared according to the above-mentioned processes are characterized in that at least 50 mole percent of the total structural units are aromatic amideimide structural units expressed by the following formula (1)

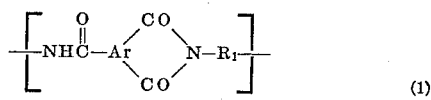

(1)

wherein Ar stands for a trivalent aromatic group, and $R_1$ stands for an organic radical having a valency of at least two, at least 30 mole percent of the total terminal groups are carboxylic acid aryl ester groups, and the inherent viscosity ($[\eta_{inh}]$) of the precursor calculated from the value as measured at 30° C. as a solution of the polymer in 100 ml. of the solution is 0.05 to 0.45.

[i] Such polyamideimide precursor may contain, as mentioned above, alcoholic hydroxyl groups and/or primary or secondary amino groups in the molecule. In this case, the precursor is self-hardenable and can be used alone as a hardenable precusor.

[ii] When the polyamideimide precursor (X) is mixed with a polyfunctional compound (Y) having in the molecules at least two alcoholic hydroxyl groups and/or amino groups, a hardenable composition may be provided. Whether the precursor (X) may have alcoholic hydroxyl groups and/or amino terminal groups in the molecule, it is particularly advantageous to employ the precursor (X) in the form of a composition formed by mixing it with the polyfunctional compound (Y), because in such composition hardening can be accomplished easily and completely.

It is preferred that the polyfunctional compound (Y) is used in such an amount that the total number of the alcoholic hydroxy groups and/or amino groups contained in the polyfunctional compound (Y), or the total number of the alcoholic hydroxy groups and/or amino groups contained in the polyfunctional compound (Y) and the plyamideimide precursor (X), when the precursor (X) has such functional groups, is not less than the total number of the carboxylic acid aryl ester terminal groups of the precursor (X).

[iii] In this invention, it is also possible to obtain a hardenable polymeric composition by reacting the precursor (X) partially with the above-mentioned polyfunctional compound (Y).

Any of the above precursor [i] and polymeric compositions [ii] and [iii] may be shaped into a structure of an optional form by heating it preferably in the molten state.

A shaping composition of the solution form may be prepared by dissolving one or more of the precursor [i] and polymeric compositions [ii] and [iii] into an organic solvent capable of dissolving them and non-reactive therewith. This composition of the solution form may be shaped into a hardened structure by coating it in the solution state or shaping it into an optional form, and heating it.

As described above, when the polyamideimide precursor (X) of this invention is obtained in the solution state, the as-obtained solution may be used as a shaping composition of the solution form. When the precursor (X) is obtained in the state suspended in an organic solvent, the suspension is converted to a solution, for instance, by adding thereto a suitable solvent and the resulting solution may be used as a shaping composition of the solution form. It is also possible to add a suitable amount of the polyfunctional compound (Y) to such solution and to effect the partial reaction between the precursor (X) and polyfunctional compound (Y), for instance, by heating, to such an extent that the resulting partial reaction product is still soluble in the solvent, whereby another type of shaping composition of the solution form may also be prepared.

As a main solvent to be used for preparation of such shaping compositions of the solution form, solvents (1) to (7) exemplified hereinabove with respect to the reaction solvent to be used for formation of the polyamideimide precursor of this invention may be mentioned. Of these solvents, disubstituted amides (1), sulfones and sulfoxides (2) and phenols (7) are especially preferred, because they have a high dissolving power and can readily be separated from a hardened structure during the hardening operation. Of course, it is possible to add other solvents to these solvents as long as separation of the polymers does not occur.

As the polyfunctional compound (Y) to be used for formation of the above-mentioned hardenable compositions, polyols and aminohydroxy compounds such as mentioned hereinabove with respect to component E and polyamines such as mentioned hereinabove with respect to component B may be exemplified. It is preferred to employ a polyfunctional compound having a functionality of three or more, namely, containing at least three alcoholic hydroxyl groups and/or amino groups in the molecule, or a mixture of polyfunctional compounds (Y) containing one or more of such polyfunctional compounds containing at least three alcoholic hydroxy groups and/or amino groups in the molecule. Preferable examples of such polyfunctional compounds having a functionality of at least three are glycerine, trimethylol-ethane, trimethylolpropane, 1,2,6-hexane-triol, tris - (β - hydroxyethyl)-isocyanurate, pentaerythritol, 2-amino-propane - 1,3 - diol, 1-amino-propane-2,3-diol, 2-amino-2-methylpropane - 1,3-diol, tris-(hydroxymethyl) - aminomethane, 1-amino-2,2-bis-(hydroxymethyl)-propane - 3 - ol, polyphenyl-polymethylene-polyamines (condensates formed from aniline and formaldehyde), lowly condensed polyesters containing on average at least 3 hydroxyl groups in the molecule, and epoxy or phenoxy resins containing on average at least 3 pendant hydroxy groups in the molecule.

In preparing a hardenable shaping composition of this invention it is preferred that a polyfunctional compound having at least two alcoholic hydroxyl groups is used as the polyfunctional compound (Y). It is especially preferred that a polyfunctional compound having at least three alcoholic hydroxyl groups or a combination of a polyfunctional compound having at least three alcoholic hydroxyl groups and a polyfunctional compound having two alcoholic hydroxyl groups is used.

Further, in preparation of such hardenable shaping composition of this invention, it is advantageous to incorporate a suitable amount of a hardening catalyst in addition to the above-mentioned polyamideimide precursor and polyfunctional compound. Catalysts such as exemplified hereinabove as the catalyst to be used for formation of the polyamideimide precursor may be used as such hardening catalyst. Use of catalysts having an ability to promote reaction between the carboxylic acid aryl ester groups in the polyamideimide precursor and the alcoholic hydroxyl groups and/or amino groups in the polyfunctional compound is especially preferred. Examples of preferable hardening catalysts are oxides, hydroxides, organic acid salts, alcoholates and organic complexes of such metals as titanium, zirconium, tin, lead, zinc, cobalt, manganese, antimony and germanium. Use of alcoholates and organic acid salts of titanium, tin, lead and zinc is especially preferred.

It is usually convenient to add such hardening catalyst in an amount of 0.005 to 10 percent by weight, especially 0.5 to 5 percent by weight, based on the sum of the precursor and polyfunctional compound or the partial reaction product thereof.

In order to increase the hardenability of the shaping composition of this invention, it is possible to add to the composition aryl esters of polycarboxylic acids such as diphenyl isophthalate, diphenyl terephthalate, diphenyl naphthalene-dicarboxylate, triphenyl trimellitate, triphenyl trimesate and tetraphenyl pyromellitate; stabilized polyisocyanates such as Desmodur® AP stable and Millionate® MS-50 (manufactured by Nippon Polyurethane Co., Ltd.); aryloxytriazines such as triphenoxytriazine; polymethyloled melamine; polyalkoxysilanes, etc. In the case of aryl esters, they are partially reacted with the precursor (X) and polyfunctional compound (Y) and used in the form of such partial reaction products.

The shaping composition of this invention may further comprise other resin, for instance, a phenol resin, an amino resin such as melamine-formaldehyde and urea-formaldehyde resins, an amide or imide resin such as polyamide, polyamideimide and polyimide resin, a polyester resin, a polyester-imide resin, and a vinyl-formal resin.

The shaping composition is especially suitable when it is used in the above-mentioned solution form for coating, wire-enamelling and the like. When the composition of this invention is used in the solution form as a coating or wire-enamelling composition, it is preferred that the nonvolatile content is 5 to 60 percent by weight.

It is also preferred that the shaping composition of this invention is put into practical use after it has been hardened at the time of the shaping operation or after the shaping operation. The hardening temperature varies depending on the polymer composition, the intended use, the hardening time and other factors, but in general, it is preferred that the hardening is carried out at a temperature ranging from 150 to 450° C., especially from 200 to 400° C.

The shaping composition of this invention is excellent in workability at shaping and hardening (or curing) operations, and the resulting hardened shaped article has a well-balanced combination of such properties as hardness, flexibility, adherence, heat resistance (or thermal stability) and chemical resistance. Thus, the composition of this invention can be conveniently applied to various uses. For instance, when the composition of this invention is utilized as a painting or coating composition, it is used for electrical insulation in such forms as a wire-enamelling composition and an impregnating varnish, or it is used for protection or decoration of aluminum equipment and heating apparatus. The composition of this invention may also be used as an adhesive or for formation of laminates.

When the shaping composition of this invention is used in the solution form as a wire-enamelling varnish for forming insulated electric wires, it is generally possible to provide electric wires of grades F to C excellent in electrically insulating characteristics. Not only a coating film composed of the composition of this invention alone, but also a laminated film composed of the composition of this invention and other resin, may be used for formation of dual-coated insulated electric wires. In the latter case, it is possible to impart various good characteristics to end wire products.

When the composition of this invention is applied in the powdery state to compression molding, transfer molding or the like optionally together with other resin, molded articles may be provided having excellent electrically insulating characteristics, heat resistance and mechanical properties, which are conveniently utilized in industrial uses where such properties are required, for instance, as machine parts and electrically insulating parts of various machines and equipment.

Some especially preferable embodiments of the shaping composition included in this invention which has been illustrated hereinbefore will now be described.

[1] A shaping composition comprising a mixture of a polyamideimide precursor and a polyfunctional compound having at least two reactive groups selected from alcoholic hydroxyl groups and amino groups or a partial reaction product formed from such polyamideimide precursor and polyfunctional compound, the polyamideimide precursor being characterized in that the main chain is constructed of 50 to 100 mole percent of the structural units expressed by the following formula (5)

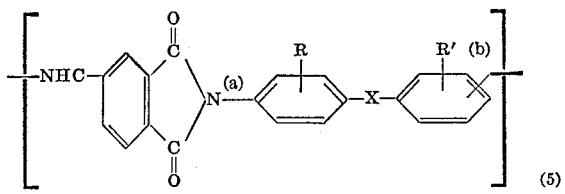

wherein X stands for a lower alkylene group having 1 to 4 carbon atoms, —O—, —SO$_2$— or

bonds (a) and (b) are at the 4,4'-position, 3,3'-position and/or 3,4'-position of the radical

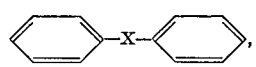

and R and R', which may be the same or different, stand for a hydrogen atom or an alkyl group of 1–3 carbon atoms, an alkoxy group of 1–3 carbon atoms or a halogen atom, and up to 50 mole percent of the structural units expressed by the following formula (6)

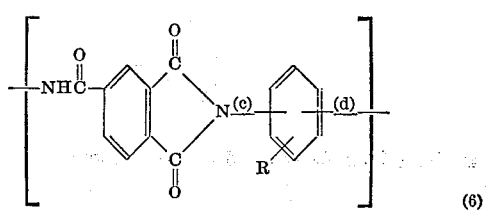

wherein bonds (c) and (d) are at the meta- and/or para-position of the phenylene group, and R is as defined in the above formula (5), and/or the structural units expressed by the following formula (7)

$$\left[-NHC(O)-\underset{R}{\text{phenyl(imide)}}-N-Y-\right]_{} \quad (7)$$

wherein Y stands for an alkylene or aralkylene group having 4–10 carbon atoms, and that the terminal groups of such polyamideimide precursor are selected from groups expressed by the following formulas (8–1), (8–2), (8–3), (8–4), and (8–5)

[structure] (8–1)

$-NH_2$ (8–2)

[structure with R] (8–3)

$-OH$ (8–4)

and $-COOH$ (8–5)

at least 40 mole percent of the total terminal groups being the terminal groups expressed by the above formula (8–1).

[2] A shaping composition comprising a mixture of a polyamideimide precursor and a polyfunctional compound having at least two reactive groups selected from alcoholic hydroxyl groups and amino groups or a partial reaction product formed from such polyamideimide precursor and polyfunctional compound, the polyamideimide precursor being characterized in that the main chain is constructed of 5 to 30 mole percent of the structural units which are selected from those expressed by the following formulas (9), (10), (11) and (12)

$$\left[-NHC(O)-\underset{(e)}{\text{phenyl}}-\underset{(f)}{\text{}}-CNH-Z-\right] \quad (9)$$

wherein bonds (e) and (f) are at the meta- or para-position of the phenylene group, and Z is a group selected from

[structure with (a), R, R', (b), X]

in above formula (5),

[structure with (c), (d), R]

in above formula (6) and —Y— in above formula (7), $$\left[-N\underset{}{\overset{}{\text{imide}}}R_7'\underset{}{\overset{}{\text{imide}}}N-Z-\right] \quad (10)$$

wherein $R_7'$ is a group selected from

[structures showing diphenyl ketone and diphenyl sulfone]

and Z is as defined in above formula (9), $$\left[-C(O)-\underset{(g)}{\text{phenyl}}-\underset{(h)}{\text{}}-C(O)-R_6'-(O)_n-\right] \quad (11)$$

wherein bonds (g) and (h) are at the meta- or para-position of the phenylene group, $R_6'$ is a divalent, trivalent or tetravalent aliphatic residue having 2–9 carbon atoms, $n$ is 2, 1 or 0, and when $n$ is 0, $-(O)_n-$ stands for a hydrogen atom, and $$\left[\underset{(m)}{\text{}}N-Z-N\underset{}{\overset{}{\text{imide}}}-C(O)-R_6'-(O)_n-\right] \quad (12)$$

wherein $m$ stands for 1 or 0, when $m$ is 0, the bond $(m)$ is a hydrogen atom, when $m$ is 1, the bond $(m)$ is a single bond, Z is as defined in above formula (9), and $R_6'$ and $-(O)_n-$ are as defined in above formula (11), and 95 to 70 mole percent of the structural units expressed by the following formula (13)

$$\left[-NHC(O)-\underset{}{\text{phenyl(imide)}}-N-Z-\right] \quad (13)$$

wherein Z is as defined in above formula (9), and that the terminal groups of the polyamideimide precursor are selected from groups expressed by the following formulas (8–1), (8–2), (8–3), (8–4) and (8–5)

[structure] (8–1)

$-NH_2$ (8–2)

[structure with R] (8–3)

$-OH$ (8–4)

and $-COOH$ (8–5)

at least 40 mole percent of the total terminal groups being the terminal groups expressed by the above formula (8–1).

Any of the polyfunctional compounds such as detailed in the instant specification with respect to the shaping composition may be used as the polyfunctional compound in the above especially preferable embodiments [1] and [2]. It is especially preferable to employ such polyfunctional compounds as exemplified as preferable examples of the polyfunctional compound hereinabove with respect to the shaping composition.

For better illustration, this invention will now be described in more detail by reference to Examples. In the Examples, the inherent viscosity ($[\eta_{inh}]$) is one calculated from the value as measured at 30° C. as a solution of the polymer in N-methylpyrrolidone having a concentration of 0.5 g. polymer in 100 ml. of the solution.

Example 1

A three-neck flask of a 3-l. capacity was charged with 267.3 g. (1.35 moles) of 4,4'-diaminodiphenylmethane and 700 g. of cresol, and the mixture was heated at 100° C. to dissolve the 4,4'-diaminodiphenylmethane in cresol. Then, 288 g. (1.5 moles) of trimellitic anhydride were gradually added to the solution under agitation. Thus, the whole reaction mixture became a yellow slurry. Then, 200 g. of xylene were added to the slurry and heated at 170–200° C. Water formed by the reaction was removed by azeotropic distillation with xylene, and 321 g. (1.5 moles) of diphenyl carbonate were added to the reaction mixture, following which the bath temperature was elevated to 240–260° C. to gradually remove a mixture of cresol and phenol formed as a by-product by distillation. After 700 g. of the above mixture had been distilled, the condensation reaction was continued under reflux for about 5 hours under agitation.

The temperature inside the flask was about 220° C., and a viscous liquid which was slightly turbid were obtained. When 840 g. of cresol was thrown into the viscous liquid, a homogeneous solution of a polyamideimide precursor was obtained.

A small quantity of the solution was taken and poured into methanol to separate the precursor, on which the measurement of the inherent viscosity, the infrared spectrum analysis and the terminal group determination were conducted. As a result it was found that the precursor had an inherent viscosity of 0.13. In the infrared spectrum analysis, the so obtained precursor was compared with a polyamideimide low polymer having a known structure, which was synthesized from trimellitic anhydride and 4,4'-diaminodiphenylmethane in N-methylpyrrolidone. Both polymers exhibited well-coincident adsorptions at a range of from 4000 cm.$^{-1}$ to 1300 cm.$^{-1}$, and thus it was confirmed that both polymers showed specific absorptions characteristic of amide and imide groups. However, with regard to the range from 1300 cm.$^{-1}$ to 650 cm.$^{-1}$, the precursor exhibited peaks at 750 cm.$^{-1}$, 1000 cm.$^{-1}$ and 1280 cm.$^{-1}$, none of which were observed in the spectrum of the comparative low polymer. Since it was presumed that these absorptions might be due to terminal aryl ester groups, the infrared spectrum analysis was conducted on a model polyamideimide having terminal phenyl groups, which was synthesized by reacting 4-phenyl trimellitate 1,2-anhydride with 4,4'-diaminodiphenylmethane in N-methylpyrrolidone. As a result, absorption peaks were observed similarly at 750 cm.$^{-1}$, 1000 cm.$^{-1}$ and 1280 cm.$^{-1}$. Thus it was concluded that these absorptions were due to the terminal aryl ester group. From the foregoing, it was confirmed that the polyamideimide precursor obtained in this Example had terminal aryl ester groups.

The determination of terminal groups was conducted in the following manner.

The precursor sample was dissolved in cresol and titration was effected with use of hydrochloric acid to determine the amount of terminal amino groups. As a result it was found that the amount of terminal amino groups was $0.9 \times 10^{-4}$ mole/g. The determination of terminal phenylurethane groups was conducted by dissolving the sample precursor in N-methylpyrrolidone, adding thereto di-n-butylamine, reacting them for 1 hour at 100° C. and conducting the titration to determine the weight decrease of di-n-butylamine. As a result it was found that the amount of terminal phenylurethane groups was $2.5 \times 10^{-4}$ mole/g. By titration the amount of terminal carboxyl groups was found to be $2.4 \times 10^{-4}$ mole/g.

It is construed that amino groups react with carboxyl groups or acid anhydride groups at a molar ratio of 1:1 to form amide and imide groups. Further, in the case of this Example, it is considered that terminal groups are limited to amino groups, urethane groups, carboxyl groups and aryl ester groups. Therefore, it is deemed that the difference between the sum of terminal amino and urethane groups and the sum of terminal carboxyl and aryl ester groups coincides with the difference between the charged equivalent of the polycarboxylic acid component and the charged equivalent of the polyamine component. Since there is no simple method of determining aryl ester groups, the amount of the terminal aryl ester groups was calculated by utilizing the above-mentioned relations, and it was found that the amount of the terminal aryl ester groups was $7.0 \times 10^{-4}$ mole/g. Thus, it was confirmed that the terminal aryl ester groups occupied about 55 mole percent of the total terminal groups.

The above-obtained solution of the precursor was incorporated with 78.3 g. (0.3 mole) of tris-($\beta$-hydroxyethyl)-isocyanurate and the reaction was carried out for 1 hour at a bath temperature of 200° C., following which 5.10 g. of tetrabutyl titanate were added to the reaction mixture. Then, the reaction was carried out at a bath temperature of 200° C. for 20 minutes. After a while, the reaction mixture was cooled, and 315 g. of solvent naphtha were thrown into the reaction mixture to obtain a wire-enamelling varnish. When the non-volatile content was measured on a residue formed by drying the varnish at 200° C. for 2 hours, it was found that the non-volatile content was 30.8 percent by weight. The solution viscosity of the so formed varnish measured at 30° C. was 35 poises.

The varnish was coated on a copper plate, and baked and hardened at 300° C. for 5 minutes after preliminary drying. As a result, a lustrous smooth coating was obtained. Even when the coated copper plate was bent by means of a cutting plier, no breakage or crack was formed on the coating. Thus, it was confirmed that the coating had good flexibility and adherence.

Under similar conditions, the varnish was coated on a glass sheet and baked. When the coated glass sheet was dipped in water for 3 days, the film could be peeled off from the glass sheet and the peeled film had a good self-sustaining property.

The varnish was coated 8–9 times on a soft copper wire having a conductor diameter of 0.30 mm. in a horizontal oven having a furnace length of about 3 m while maintaining the oven temperature at 400–450° C. to obtain an insulated wire. For comparison, insulated wires were prepared under the same conditions by employing a commercially available cresol solution varnish of a polyester imide of the H-class and a commercially available N-methylpyrrolidone solution varnish of a polyamideimide of the C-class (solution of poly-4,4'-diphenylmethane trimellitamideimide in N-methylpyrrolidone). The varnish formed in this Example exhibited the wire-enamelling workability superior to that of the polyamideimide solution varnish and comparable to that of the polyesterimide solution varnish. Properties of these coated wires are shown in Table 1, from which it is seen that the electric wire coated with the varnish of this Example exhibited properties superior to those of the electric wire coated with the commercially avaliable polyesterimide varnish and comparable to those of the electric wire coated with the commercially available polyamideimide varnish and that the electric wire coated with the varnish of this Example could conveniently be put into practical use. Determination of properties of electric wires was conducted according to the method of measuring properties of polyester-coated electric wires stipulated by JIS.

TABLE 1.—GENERAL PROPERTIES OF ENAMELLED WIRES

| | Enamelling composition | | | |
|---|---|---|---|---|
| | Example | | H-Class polyester-imide (Comparison) | C-Class polyamide-imide (Comparison) |
| | 1 | 2 | | |
| Wire size: | | | | |
| Bare wire diameter (mm.) | 0.300 | 0.300 | 0.300 | 0.300 |
| Finish wire diameter (mm.) | 0.352 | 0.350 | 0.355 | 0.350 |
| Appearance | Good | Good | Good | Good |
| Pin hole test (pin holes per meter length): | | | | |
| Untreated | 0 | 0 | 0 | 0 |
| 10% stretched | 0 | 0 | (1) | 0 |
| Flexibility: Quick snap (wound on rod of same diameter) | Good | Good | Good | Good |
| Abrasion resistance: | | | | |
| Repeated scrape test (300 g. load, strokes) | 42 | 40 | 31 | 45 |
| Unidirectional scrape test (load, kg.) | 1.25 | 1.23 | | 1.27 |
| Cut-through temperature (° C.) (4-point-crossing, 500 g. load) | 380 | 375 | 330 | 400 |
| Thermal shock resistance (270° C., 1 hr., 20% stretched) | Good | Good | (2) | Good |
| Break-down voltage (twisted pair method): | | | | |
| Untreated (kv./0.1 mm.) | 16.5 | 16.5 | 16.6 | 16.0 |
| After aging at 240° C. for 7 days | 16.0 | 16.2 | 11.9 | |
| After aging at 260° C. for 7 days | 11.9 | 11.8 | | 118 |
| Chemical resistance: Dipped in 10% aq. NaOH at room temperature for 24 hours | Good | Good | (2) | Good |

1 Many. 2 Failed.

Comparative Example 1

The procedures of Example 1 were repeated except that diphenyl carbonate was not used.

Prior to addition of tris-($\beta$-hydroxyethyl)-isocyanurate, a small quantity of the precursor solution was taken and poured into methanol. With respect to the so recovered precursor, the measurement of the inherent viscosity, the infrared spectrum analysis and the determination of terminal groups were conducted in the same manner as in Example 1.

The precursor was found to have an inherent viscosity of 0.17. In the infrared spectrum, absorptions were observed at 750 cm.$^{-1}$, 1000 cm.$^{-1}$ and 1280 cm.$^{-1}$, and though the intensity of each absorption was not so strong, points at which these absorptions appeared were quite in agreement with those in the infrared absorption spectrum of the precusor of Example 1. These absorptions at 750 cm.$^{-1}$, 1000 cm.$^{-1}$ and 1280 cm.$^{-1}$ indicate that cresyl ester groups were formed in the precursor by the reaction of carboxyl groups with cresol used as a solvent. As a result of the terminal group determination, it was found that the amounts of terminal amino and carboxyl groups were 1.4×10$^{-4}$ mole/g. and 6.6×10$^{-4}$ mole/g., respectively. The amount of the terminal aryl ester groups calculated from these data was 0.7×10$^{-4}$ mole/g. Thus, it was found that the terminal aryl ester groups occupied 8 mole percent of the total terminal groups of the precursor.

The precursor solution was incorporated with tris-($\beta$-hydroxyethyl)-isocyanuate and the partial reaction was carried out in the same manner as in Example 1 to obtain a cresol solution varnish, whose non-volatile content was 30.2% by weight and whose solution viscosity as measured at 30° C. was 52 poises.

The varnish was coated on a copper plate, and baked at 300° C. for 5 minutes after preliminary drying. When the coated copper plate was bent, cracks were readily formed. Thus, it was found that the varnish failed to provide a continuous film having sufficient mechanical properties. When the varnish was coated and baked on a glass sheet, it was impossible to peel off a film having a definite form from the glass sheet, and the baked film was very fragile. From the foregoing, it is seen that although the varnish obtained in this Example had a higher viscosity than the varnish obtained in Example 1, it was inferior to the varnish of Example 1 in hardenability and film-forming property.

Comparative Example 2

In the same manner as in Comparative Example 1, 288 g. (1.5 moles) of trimellitic anhydride and 267.3 g. (1.35 moles) of 4,4'-diaminodiphenylmethane were reacted in cresol at high concentration and at high temperature for about 5 hours. Then, 32.1 g. (0.15 mole) of diphenyl carbonate were added to the reaction mixture, and the reaction was further continued for 3 hours under the same conditions, following which cresol was added to the reaction mixture to obtain a solution of the resulting precursor in cresol. A small quantity of the solution was taken and poured into methanol. With respect to the so recovered precursor, the inherent viscosity measurement, the infrared spectrum analysis and the terminal group determination were conducted in the same manner as in Example 1.

The inherent viscosity of the precursor was found to be 0.14.

In the infrared spectrum of the precursor, absorption peaks were observed at 750 cm.$^{-1}$, 1000 cm.$^{-1}$ and 1280 cm.$^{-1}$, from which formation of terminal aryl ester groups was confirmed.

Amounts of terminal amino, urethane and carboxyl groups were found to be 0.5×10$^{-4}$ mole/g. 0.8×10$^{-4}$ mole/g. and 5.4×10$^{-4}$ mole/g., respectively. From these data, the amount of terminal aryl ester groups was calculated to be 1.9×10$^{-4}$ mole/g. Thus, it was found that the terminal aryl ester groups occupied 22 mole percent of the total terminal groups of the precursor.

The above cresol solution of the precursor was incorporated with tris-($\beta$-hydroxyethyl)-isocyanuate and the partial reaction was carried out in the same manner as in Example 1 to obtain a cresol solution varnish, whose non-volatile content was 30.3 percent by weight and whose soltuion viscosity as measured at 30° C. was 40 poises.

The so formed varnish was coated on either a copper plate or a glass sheet, and it was baked and hardened at 300° C., after preliminary drying. When the coated copper plate was bent, cracks were formed though the degree of formation of cracks was a little less than in Comparative Example 1. The film formed on the glass sheet was very poor in self-sustaining property and was very fragile. The hardenability of the varnish obtained in this Example was somewhat superior to that of the varnish obtained in Comparative Example 1 but much inferior to that of the varnish obtained in Example 1. With regard to the film-forming property, the varnish of this Example was much inferior to the varnish of Example 1.

Example 2

A precursor was prepared in the same manner as in Example 1 except that an amine mixture consisting of 89 mole percent of 4,4'-diaminodiphenylmethane and 11 mole percent of 2,4-diaminotoluene was used instead of 4,4'-diaminodiphenylmethane. In the same manner as in Example 1, the resulting precursor solution was partially reacted with tris-($\beta$-hydroxyethyl)-isocyanurate to obtain a varnish. The degree of aryl-esterification in the terminal groups of the precursor was 58 percent, and the varnish had a non-volatile content of 30.5 percent by weight and a solution viscosity of 38 poises as measured at 30° C.

An enamelled wire was prepared in the same manner as in Example 1 by employing the so prepared varnish. The wire-enamelling workability of the varnish was as excellent as that of the varnish of Example 1. Properties of the resulting enamelled wire are shown in Table 1 above, from which it is seen that the varnish obtained in this Example was excellent in practical utility.

In order to determine properties as an adhesive of the varnish of this Example, the following test was conducted.

A test steel plate having a size of 100 mm. x 25 mm. was cut from a mild steel plate having a thickness of 6 mm., and surfaces of the test steel plate were washed with trichlene and polished with a sand blast, followed by washing with carbon tetrachloride. The varnish was coated thinly on the test plate along the width of 12 mm. on the shorter sides of the plate, followed by preliminary drying. Two test plates so coated with the varnish were piled by single lap joint and the curing was conducted at 300° C. for 2 hours under a pressure of 10 kg./cm.² The shear bonding strength of the bonded sample was found to be 210 kg./cm.²

Example 3

A precursor was prepared in the same manner as in Example 1 except that an amine mixture consisting of 89 mole percent of 4,4'-diaminodiphenylmethane and 11 mole percent of hexamethylenediamine was used instead of 4,4'-diaminodiphenylmethane. The resulting reaction mixture was a substantially homogeneous solution, even prior to dilution with cresol. Thus, it was found that the solubility of the precursor obtained in this Example in cresol was highly improved over the solubility in cresol of the precursor obtained in Example 1. The inherent viscosity of the precursor was 0.12, and the amounts of terminal amino, carboxyl and urethane groups were $1.1 \times 10^{-4}$ mole/g., $2.6 \times 10^{-4}$ mole/g. and $2.6 \times 10^{-4}$ mole/g., respectively. From these date, the amount of terminal phenyl groups was calculated to be $6.8 \times 10^{-4}$ mole/g. Thus, the degree of aryl-esterification of the terminal groups in the precursor was 52%.

In the same manner as in Example 1, the precursor solution was incorporated with tris-($\beta$-hydroxyethyl)-isocyanurate and the partial reaction between the precursor and the isocyanate was carried out to obtain a varnish. When the varnish was dried at 200° C. for 2 hours, the non-volatile residue content was 31.5% by weight. The viscosity of the varnish as measured at 30° C. was 50 poises. When a small quantity of the varnish was thrown into methanol and the inherent viscosity of the precipitated polycondensate was measured, it was found that the polycondensate had an inherent viscosity of 0.21.

The solution varnish was coated on a glass sheet and hardened at 300° C. for 5 minutes after preliminary drying. When the coating was peeled off from the glass sheet, a flexible film was obtained.

For comparison, the reaction was carried out under the same conditions as above except that diphenyl carbonate was not added, and as a result, a similar solution was obtained. The inherent viscosity of the separated polycondensate was 0.23. However, a film obtained by baking the solution on a glass sheet in the same manner as above had no self-sustaining property and was very fragile.

The varnish obtained in this Example was coated 5–7 times on a soft copper wire having a conductor diameter of 0.7 mm. at 300–400° C. at a wire speed of 3 m./min. with use of a vertical test oven to obtain an insulated wire having a softening point of above 350° C. as measured by the temperature-elevating method, an abrasion resistance of 115 strokes as measured by the repeated scrape test method, and a good thermal shock resistance tested at 250° C. for 1 hour in the state wound on a rod of the same diameter.

Example 4

A three-neck flask of a 3-l. capacity was charged with 178.2 g. (0.9 mole) of 4,4'-diaminodiphenylmethane and 500 g. of cresol. After the 4,4'-diaminodiphenylmethane was dissolved in cresol, 192 g. (1.0 mole) of trimellitic anhydride were gradually added to the solution at 100° C., following which the bath temperature was elevated to 240–250° C. and the reaction mixture was concentrated until the solid content was about 80% by weight, while expelling cresol gradually. Then, the reaction was further continued for 3 hours under reflux. During the course of the reaction, the reaction mixture became a homogeneous solution having a high viscosity. Then, 53.5 g. (0.25 mole) of diphenyl carbonate were added to the reaction mixture, and the concentration was gradually conducted until the inside temperature of the flask reached 220° C. Then, the reaction was further continued for 4 hours under reflux. The inherent viscosity of the resulting precursor was 0.15, and the degree of aryl-esterification in the terminal groups of the precursor was 42%.

Separately, a mixture of 388 g. of dimethyl terephthalate, 120 g. of ethyleneglycol, 70 g. of glycerine and 0.2 g. of lead acetate was heated at 120–130° C., while distilling off methanol formed as a by-product. When the distillation was almost completed, the reaction mixture was heated at 200–220° C. As a whole, the reaction was carried out for 12 hours under agitation and heating. After completion of the reaction, cresol was added to the reaction mixture in such an amount that the resin content was 40% by weight. The resulting solution was mixed with the above precursor solution, and the mixture was heated at a bath temperature of 200° C. for 30 hours. Then, 5 g. of tetrabutyl titanate were added to the mixture and it was then cooled. When the mixture was cooled to a suitable temperature, it was diluted with cresol and solvent naphtha at a cresol:solvent naphtha ratio of 75:25 so that the non-volatile content was 32% by weight. The resulting solution was coated as a wire-enamelling varnish on a soft copper wire having a conductor diameter of 0.7 mm. and baked under substantially the same conditions as adopted in Example 3 to obtain an insulated electric wire having a softening point exceeding 320° C. as measured by the temperature-elevating method, an abrasion resistance of 82 strokes as measured by repeated scrape test method and a good thermal shock resistance tested at 180° C. for 3 hours in the state wound on a rod of the same diameter.

Example 5

A three-neck flask of a 3-l. capacity was charged with 79.2 g. (0.4 mole) of 4,4'-diaminodiphenylmethane and 250 g. of N-methylpyrrolidone, and the mixture was heated to 100° C., following which 96.0 g. (0.5 mole) of trimellitic anhydride were gradually added to the mixture. After addition of 50 ml. of xylene, the bath temperature was raised to 200° C. and water formed as a by-product by imidation was removed together with xylene. Then, 107 g. (0.5 mole) of diphenyl carbonate were added to the reaction mixture, and the bath temperature was raised to 240–260° C. to thereby distill off N-methylpyrrolidone gradually. After the solid content reached about 80% by weight, the reaction mixture was refluxed for about 3 hours. The reaction mixture was then diluted with 380 g. of N-methylpyrrolidone. A small quantity of the resulting solution was poured into water, and the precipitated reaction product was separated and subjected to the infrared spectrum analysis. In the infrared spectrum, absorptions deemed to be owing to terminal 4-phenoxy-carbonyl-phthalimide groups were observed at 750 cm.⁻¹, 1000 cm.⁻¹ and 1280 cm.⁻¹ as well as strong absorptions characteristics of amide and imide groups. As a result of the terminal group determination it was found that the degree of aryl-esterification in the terminal groups was 53%. The inherent viscosity of the reaction product was 0.21.

The above solution was incorporated with 26.1 g. (0.1 mole) of tris-($\beta$-hydroxyethyl)-isocyanurate and 3.28 g. of dibutyl tin dilaurate, and the mixture was heated at 170° C. for 1 hour. The resulting solution was coated on a glass sheet, dried preliminarily, and heated and hardened at 300° C. for 5 minutes. As a result, a flexible film was obtained. The polycondensate recovered from this solution had an inherent viscosity of 0.32.

Example 6

Procedures of Example 5 were repeated except that a mixture of 95 mole percent of trimellitic anhydride and 5 mole percent of benzophenone-tetra-carboxylic dianhydride was used instead of trimellitic anhydride and a mixture of 90 mole percent of 4,4'-diaminodiphenylmethane and 10 mole percent of toluylenediamine was used instead of 4,4'-diaminodiphenylmethane. Diphenyl carbonate was added and reacted with the reaction mixture in the same manner as in Example 5. Then, 250 g. of N-methylpyrrolidone were added to the reaction mixture to dilute it. Then, 24.9 g. of a polyphenylene-polymethylene-polyamine having an average degree of condensation of 2.5 were added to the diluted reaction mixture, and the heating was effected for about 1 hour while maintaining the bath temperature at 230° C.

The resulting solution was coated on a glass sheet, preliminarily dried, and heated and hardened at 350° C. for 5 minutes to obtain a film having a good self-sustaining property. The film was cut into pieces by means of scissors and they were subjected to thermogravimetric analysis in the air at a temperature-elevating rate of 5° C./min. As a result, a substantial weight decrease was not observed at temperatures of up to about 400° C. Thus, it was confirmed that the film had a good heat resistance.

The above solution was poured into water, and the precipitated polycondensate was recovered. The resulting powdery polycondensate was packed in a cylinder and heated at 350° C. for 5 minutes under a pressure of 150 kg./cm.$^2$, during which the gas was once let out of the cylinder. As a result, a dark-brown, tough molded structure of a cylindrical configuration was obtained.

Example 7

A three-neck flask of a 200-ml. capacity was charged with 19.2 g. (0.1 mole) of trimellitic anhydride, 19.8 g. (0.1 mole) of 4,4'-diaminodiphenylmethane and 50 g. of N-methylpyrrolidone. Under a nitrogen current the charge was heated for 3 hours at a bath temperature approximating 250° C. to cause the reaction among them while distilling off gradually N-methylpyrrolidone, until the solid content in the reaction mixture was concentrated to about 80% by weight.

Then, 4.61 g. (0.024 mole) of trimellitic anhydride were added to the reaction mixture and the reaction was allowed to advance for a while. Then, 10.7 g. (0.05 mole) of diphenyl carbonate were added to the reaction mixture and the reaction was carried out for about 3 hours while maintaining the bath temperature at 220–230° C. The inherent viscosity of the resulting precursor was 0.21, and the degree of aryl-esterification in the terminal groups of the precursor was 45%.

Volatile components were distilled off from the resulting reaction mixture just before occurrence of solidification, and then 80 ml. of cresol and 13 g. (0.05 mole) of tris-($\beta$-hydroxyethyl)-isocyanurate were added to the reaction mixture, following which the reaction was carried out at 200° C. for 1 hour. Then, 0.8 g. of tetrabutyl titanate was added to the reaction mixture and the reaction was further conducted at 150° C. for 30 minutes. A slightly turbid reddish brown solution was obtained. The solution was coated on a copper plate, preliminarily dried, and hardened and baked at 300° C. for 5 minutes. A lustrous, flexible coating excellent in adherence was obtained.

Example 8

A three-neck flask of 3-l. capacity was charged with 238 g. (1.2 moles) of 4,4'-diaminodiphenylmethane, 18 g. (0.15 mole) of a mixture of 2,4-toluylenediamine and 2,6 - toluylenediamine and 500 g. of cresol, and they were heated at 100° C. to form a solution of them. Under agitation 288 g. (1.5 moles) of trimellitic anhydride were gradually added to the solution, followed by addition of xylene. Then, the mixture was heated and water formed by the reaction was removed together with xylene by azeotropic distillation. Then, 321 g. (1.5 moles) of diphenyl carbonate and 5.1 g. of tetrabutyl titanate were added to the reaction mixture, and the bath temperature was elevated to 240–260° C. to distill off a mixture of cresol and phenol formed as a by-product. After about 510 g. of the above mixture had been distilled off, the condensation reaction was continued under reflux for about 2 hours. The inside temperature was 225° C. and the reaction mixture was a viscous liquid. Then, 680 g. of cresol were added to the viscous liquid to obtain a solution of a polyamideimide precursor. A very small quantity of the so formed solution was poured into methanol to separate the precursor, which was then subjected to the inherent viscosity measurement, the infrared spectrum analysis and the terminal group determination in the same manner as in Example 1.

The inherent viscosity of the precursor was 0.16.

In the infrared spectrum, an absorption due to the amide group was observed at 1660 cm.$^{-1}$, and absorptions due to the terminal aryl ester group were observed at 750 cm.$^{-1}$, 1000 cm.$^{-1}$ and 1280 cm.$^{-1}$. The intensity of these absorptions due to the terminal amide and aryl ester groups was stronger than the intensity of corresponding adsorptions of the precursor obtained in Example 2.

The amounts of terminal amino, urethane carboxyl groups were $0.4 \times 10^{-4}$ mole/g., $2.4 \times 10^{-4}$ mole/g. and $0.2 \times 10^{-4}$ mole/g., respectively, from which the amount of the terminal aryl ester groups was calculated to be $8.6 \times 10^{-4}$ mole/g. Thus, the aryl ester groups occupied 74 mole percent of the total terminal groups of the precursor. From the foregoing, it is seen that addition of the catalyst greatly improved the aryl-esterification degree in the terminal groups of the precursor.

Then, 78.3 g. (0.3 mole) of tris-($\beta$-hydroxyethyl)-isocyanurate were added to the above precursor solution, followed by addition of 20 g. of tetrabutyl titanate. The mixture was reacted at a bath temperature of 200° C. for 40 minutes, and 400 g. of xylene were added to the reaction mixture to dilute it. As a result, a varnish having a non-volatile content of 30.4% by weight and a solution viscosity of 47 poises as measured at 30° C. was obtained.

The so formed varnish was coated on a copper plate, and the hardening and baking properties of the varnish were compared with those of the varnish obtained in Example 2. In the case of the varnish obtained in Example 2, in order to obtain a coating which did not crack by bending with a cutting plier, the baking had to be effected at 300° C. for at least 3 minutes. In contrast, in the case of the varnish of this Example, when the baking was conducted at 300° C. for only one minute, a coating was obtained which did not crack when bent by means of a cutting plier and which exhibited good flexibility and adherence. Thus, it is seen that the varnish obtained in this Example had a further improved hardenability.

The above varnish was then coated on a glass sheet, and baked at 300° C. for 5 minutes. When the coated glass sheet was allowed to stand in water for 3 days, the coated film was peeled off from the glass sheet. This film had a strength of 985 kg./cm.$^2$ and an elongation of 7.4%.

Example 9

A three-neck flask of a 3-l. capacity was charged with 267.3 g. (1.35 moles) of 4,4'-diaminodiphenylmethane, 35.7 g. (0.3 mole) of 2-amino-2-methyl-1,3-propane-diol and 750 g. of cresol, and they were heated to 100° C. to form a solution. Then, under agitation 288 g. (1.50 moles) of trimellitic anhydride were gradually added to the solution. Then, 200 g. of xylene were added to the mixture and the bath temperature was elevated to 180–200° C. Water formed by the reaction was removed together with xylene by azeotropic distillation. Then, 500 g. of cresol were distilled off by elevating the bath temperature to 240–260° C., following which the reaction was carried out under reflux for about 2 hours. Then, 160 g. (0.75 mole) of diphenyl carbonate were added to the reaction mixture, and 100 g. of a mixture of cresol and phenol formed as a by-product were distilled off. Then, the reaction was carried out again under reflux for about 4 hours at a bath temperature of 240–260° C. The reaction mixture became a dark-brown, viscous, homogeneous solution, to which 580 g. of cresol were added to obtain a precursor solution.

A small quantity of the solution was taken and poured into methanol to precipitate the precursor, which was then subjected to the inherent viscosity measurement and the terminal group determination in the same manner as in Example 1.

The inherent viscosity of the precursor was 0.20.

Then, 5 g. of tetrabutyl titanate were added to the precursor solution, and the reaction was furthered at a bath temperature of 200° C. for 1 hour, following which 375 g. of xylene were added to the reaction mixture to obtain a varnish having a non-volatile content of 30.4% by weight and a solution viscosity of 46 poises as measured at 30° C.

The varnish was coated on a copper plate, preliminarily dried, and hardened and baked at 300° C. for 5 minutes to obtain a lustrous and smooth coating. When the so coated copper plate was bent by a cutting plier, no crack was formed, and the coating exhibited good flexibility and adherence.

Under similar conditions the varnish was coated and baked on a glass sheet. A film having a good self-sustaining property and excellent in flexibility was obtained.

Example 10

A three-neck flask of a 3-l. capacity was charged with 288 g. (1.5 moles) of trimellitic anhydride and 500 g. of cresol, and the charge was heated to 100° C. Under agitation 337.5 g. (1.35 moles) of 4,4'-diphenylmethane diisocyanate were gradually added to the mixture. The bath temperature was raised to 220–240° C. and cresol was gradually distilled off. After about 250 g. of cresol had been distilled off, the reaction was carried out under reflux for about 2 hours at a bath temperature of 240° C. The inside temperature was 223° C. and at the initial stage of the reaction bubbling was extreme in the reaction mixture, and the reaction mixture was changed from a brown transparent solution to a turbid viscous liquid. Then, 160.5 (0.75 mole) of diphenyl carbonate and 5.0 g. of tetrabutyl titanate were added to the reaction mixture, and 130 g. of a mixture of cresol and phenol formed as a by-product was distilled off. Then, the reaction was carried out for 3 hours by changing the reaction manner to the refluxing manner again. As the reaction proceeded, the turbidness increased in the reaction mixture, but after completion of the reaction, addition of 680 g. of cresol converted the turbid reaction liquor to a homogeneous solution comprising a polyamideimide precursor.

A very small quantity of the so formed solution was taken and poured into methanol to separate the precursor, which was then subjected to the inherent viscosity measurement, the infrared spectrum analysis and the terminal group determination in the same manner as in Example 1.

The inherent viscosity of the precursor was found to be 0.15.

The pattern of the infrared spectrum of the precursor was quite in agreement with that of a precursor obtained by reacting trimellitic anhydride, 4,4'-diaminodiphenylmethane and diphenyl carbonate in cresol. Thus, it was confirmed that amide linkages, imide linkages and terminal aryl ester groups were formed in the precursor obtained in this Example.

Amounts of terminal urethane and carboxyl groups were found to be $3.0 \times 10^{-4}$ mole/g. and $0.3 \times 10^{-4}$ mole/g., respectively, from which the amount of terminal aryl ester groups was calculated to be $8.6 \times 10^{-4}$ mole/g. Thus, it was confirmed that the terminal aryl ester groups occupied 72 mole percent of the total terminal groups of the precursor.

Then, 78.3 g. (0.3 mole) of tris-$\beta$-hydroxyethyl)-isocyanurate and 20 g. of tetrabutyl titanate were added to the above precursor solution, and the reaction was carried out at 200° C. for 1 hour. Then, the reaction mixture was slightly cooled and diluted with addition of 400 g. of xylene to obtain a varnish having a non-volatile content of 30.9% by weight and a solution viscosity of 50 poises as measured at 30° C.

The so formed varnish was coated on a copper plate, preliminarily dried, and hardened and baked at 300° C. for 5 minutes. A lustrous and smooth coating, which exhibited good flexibility and adherence and in which no crack was formed when it was bent by means of a cutting plier was obtained.

Example 11

19.2 g. (0.1 mole) of trimellitic anhydride and 20 g. (0.08 mole) of 4,4'-diphenylmethane diisocyanate were dissolved in 20 ml. of dehydrated N-methylpyrrolidone, and they were reacted at 170° C. for 3 hours. Then, 8.6 g. (0.04 mole) of diphenyl carbonate were added to the reaction mixture, and the reaction was carried out at a bath temperature of 240° C. for about 4 hours while gradually distilling off N-methylpyrrolidone.

After volatile components had been distilled off just before occurrence of solidification, the reaction mixture was incorporated with 80 ml. of cresol, 3.2 g. (0.01 mole) of diphenyl terephthalate and 13 g. (0.05 mole of tris-($\alpha$-hydroxyethyl)-isocyanurate, and the reaction was carried out for 1 hour at a bath temperature of 200° C., following which 0.7 g. of tetrabutyl titanate was added to the reaction mixture and it was heated at 150° C. for 20 minutes to obtain a reddish brown coating solution. When the solution was coated on a copper plate, preliminarily dried and baked at 300° C. for 5 minutes, a lustrous coating excellent in flexibility, adherence and electrically insulating property was obtained.

Example 12

A three-neck flask of a 3-l. capacity was charged with 288 g. (1.5 moles) of trimellitic anhydride and 700 g. of N-methylpyrrolidone, and they were heated to 100° C. Under agitation 300 g. (1.2 moles) of 4,4'-diphenylmethane diisocyanate were gradually added to the mixture, and the reaction was carried out for 3 hours while elevating the bath temperature to 160–170° C. The reaction mixture took the form of a yellow homogeneous solution. A small portion of the so formed solution was coated on a halite plate and dried to determine the infrared absorption spectrum. In addition to absorptions observed in conventional polyamideimides, an absorption owing to the acid anhydride group was observed at 1840 cm.$^{-1}$ in the infrared spectrum of the above solution.

Then, 23.7 g. (0.24 mole) of 4,4'-diaminodiphenylmethane were added to the solution, followed by addition of 200 g. of xylene. Water formed by the reaction was removed together with xylene by azeotropic distillation. Then, 128.4 g. (0.6 mole) of diphenyl carbonate were added to the reaction mixture and the bath temperature was raised to 220–230° C. to distill off 400 g. of N-methylpyrrolidone. Then, the reaction was further continued under reflux for 4 hours.

Then, 600 g. of N-methylpyrrolidone were added to the reaction mixture to obtain a solution of a polyamideimide precursor. A small quantity of the solution was added to water to separate the precursor, and its inherent viscosity was measured. As a result it was found that the precursor had an inherent viscosity of 0.23. Another small quantity of the solution was taken and coated on a halite plate, followed by drying, to conduct the infrared absorption spectrum measurement. The absorption at 1840 cm.$^{-1}$ due to the acid anhydride group was no longer observed but absorptions due to the terminal aryl ester group were observed instead at 750 cm.$^{-1}$, 1000 cm.$^{-1}$ and 1280 cm.$^{-1}$. As a result of the terminal group determination, it was found that the degree of aryl-esterification in the terminal groups of the precursor was 53%.

Then, 12.4 g. (0.2 mole) of ethyleneglycol, 13.6 g. (0.1 mole) of pentaerythritol and 10 g. of dibutyl tin dilaurate were added to the above precursor solution, and the reaction was carried out at a bath temperature of 180° C. for about 1 hour, following which the reaction mixture was diluted by addition of 225 g. of xylene to form a varnish solution. The solution was coated on a glass sheet, preliminary dried and baked at 300° C. for 4 minutes to effect hardening. A flexible film having a self-sustaining property was obtained.

Comparative Example 3

A mixture of 11.5 g. (0.06 mole) of trimellitic anhydride, 9.9 g. (0.05 mole) of 4,4'-diaminodiphenylmethane, 2.6 g. (0.01 mole) of tris-(β-hydroxyethel)-isocyanurate and 25 g. of cresol were heated for 10 hours at a bath temperature of 250° C. Then, 0.15 g. of tetrabutyl titanate was added to the reaction mixture, and the reaction mixture was heated at 150° C. for 1 hour. The resulting solution was coated on a glass sheet, and heated and dried at 150° C. for 1 hour and at 300° C. for 5 minutes, but a film having a self-sustaining property could not be obtained.

Example 13

A mixture of 2 moles of 4-phenyl trimellitate 1,2-anhydride, 1.4 moles of 4,4'-diaminodiphenylmethane, 0.4 mole of hexamethylenediamine and 0.2 mole of tris-(β-hydroxyethyl)-isocyanurate was heated under reflux at a bath temperature of 250° C. for 7 hours in cresol at such a concentration of reactants that the concentration of the resulting precursor was 40% by weight. The resulting precursor contained in the soltuion had an inherent viscosity of 0.20. Then, 5 ml. of tetrabutyl titanate was added to the solution, and it was further heated at 200° C. for 15 minutes, followed by dilution with cresol and solvent naphtha to obtain a solution containing the precursor at a concentration of 30% by weight.

The resulting solution was coated on a soft copper wire having a conductor diameter of 1 mm. by employing a die and baked at a furnace temperature of 300–400° C. at a wire speed of 13–15 m./min. The above coating and baking procedures were repeated 5–7 times to obtain an insulated electric wire having a coating thickness of about 0.035 mm.

Properties of the so formed insulated electric wire are shown in Table 2 given hereinbelow, from which it will readily be understood that the insulated electric wire obtained in this Example was very excellent in heat resistance.

Separately, the above solution was coated on a glass sheet, and heated and dried at 150° C. for 2 hours and at 300° C. for 5 minutes. A tough film of a brown color was obtained.

Example 14

A precursor solution was prepared in the same manner as in Example 13 except that 2 moles of 4-phenyl trimellitate 1,2-anhydride, 1.5 moles of 4,4'-diaminophenylmethane and 0.5 mole of tris-β-hydroxyethyl)-isocyanurate were employed. The so formed precursor solution was diluted with cresol and solvent naphtha so that the precursor concentration was 30% by weight. In the same manner as in Example 13, an insulated electric wire was prepared by employing the above solution. Properties of the so formed insulated electric wire are shown in Table 2 given hereinbelow, from which it will readily be understood that the so formed insulated electric wire had an excellent heat resistance.

The precursor was separated from a small part of the solution formed by the reaction and the inherent viscosity thereof was measured. As a result it was found that the precursor had an inherent viscosity of 0.25.

Example 15

A mixture of 194 g. of dimethyl terephthalate, 60 g. of ethyleneglycol, 35 g. of glycerine and 0.2 g. of lead acetate was heated at 120–130° C. while distilling off methanol formed as a by-product. When the distillation of methanol was almost completed, the heating temperature was raised to 200–220° C. The total heating time was 8 hours.

Separately, a mixture of 536 g. (2 moles) of 4-phenyl trimellitate 1,2-anhydride, 277 g. (1.4 moles) of 4,4'-diaminodiphenylmethane and 34.8 g. (0.3 mole) of hexamethylenediamine was heated under reflux at a bath temperature of 250° C. for 2.5 hours in 1200 g. of cresol, while gradually distilling off water and cresol. To the resulting reaction mixture was added the polyester compound synthesized above, and the mixture was heated at a bath temperature of 240° C. for 4 hours. At the end of the reaction 7 ml. of tetrabutyl titanate was added to the reaction mixture and it was diluted with cresol and solvent naphtha so that the precursor concentration was 30% by weight. With use of the resulting solution, an insulated electric wire was prepared under the same conditions as in Example 13. Properties of the insulated electric wire are shown in Table 2 given hereinbelow.

TABLE 2.—GENERAL PROPERTIES OF ENAMELLED WIRES

| | Enamelling varnish | | |
|---|---|---|---|
| | Example 13 | Example 14 | Example 15 |
| Built film thickness (mm.) | 0.036 | 0.035 | 0.036 |
| Number of pin holes per 5 m. length | 0 | 0 | 0 |
| Break-down voltage (value calculated as kv./0.1 mm.) [1] | 13.8 | 13.6 | 13.5 |
| Abrasion resistance (700 g. load, strokes) [2] | 150 | 140 | 85 |
| Thermal shock resistance: [3] | | | |
| 200° C., 2 hrs | Good (wound on rod of same diameter). | Good (wound on rod of same diameter). | Good (wound on rod of two-fold diameter). |
| 250° C., 1 hr | do | do | Good (wound on rod of three-fold diameter). |
| Flexibility test: [4] | | | |
| Untreated | do | do | Good (wound on rod of same diameter). |
| After aging at 230° C. for 6 hours | do | do | Good (wound on rod of three-fold diameter). |
| Cut-through temperature (° C.) (800 g. load, temperature-increasing method).[5] | 350 | 370 | 340 |

[1] Twisted pair test specimens were used.
[2] Abrasion tester of the reciprocating type was used.
[3] Wire was heated at prescribed temperature for prescribed time in the state wound on a rod having a certain diameter, and formation of cracks was observed by naked eyes.
[4] In the untreated state or after aging at prescribed temperature for prescribed time, sample was wound 10 times on rod of a certain diameter, and formation of cracks was observed through magnifier.
[5] Samples were crossed each other vertically in furnace and the temperature at which short-cut occurred was read when the furnace temperature was gradually increased.

Example 16

10.72 g. (0.04 mole) of 4-phenyl trimellitate 1,2-anhydride was mixed with 4.98 g. (0.02 mole) of 4,4'-diaminodiphenylamine, 4.98 g. (0.02 mole) of a polymethylene-polyphenylene-polyamine containing on average 2.5 amino groups per molecule, 0.70 g. (0.006 mole) of hexamethylene diamine and 30 ml. of cresol, and the temperature was gradually elevated and the mixture was heated under reflux at a bath temperature of 250° C. for 3 hours. After completion of the reaction the resulting precursor was separated by precipitation and the inherent viscosity was measured. As a result it was found that the precursor had an inherent viscosity of 0.30. The above reaction solution was coated on a glass sheet and heated and dried at 150° C. for 2 hours and at 330° C. for 5 minutes to obtain a yellowish brown film which was tough with a good self-sustaining property. The solution was baked under similar conditions to obtain a lustrous coating. When the coating was subjected to the cross-cut adhesive cellophane tape peeling test, no peeling was observed, and when the coating was subjected to the bending test, no crack was formed.

Example 17

26.8 g. (0.1 mole) of 4-phenyl trimellitate 1,2-anhydride, 11.9 g. (0.06 mole) of 4,4'-diaminodiphenylmethane and 2.4 g. (0.02 mole) of 2,4-diaminotoluene were dissolved in 60 ml. of N-methylpyrrolidone, and they were reacted under reflux for 6 hours.

Separately, a mixture of 19.9 g. of dimethyl isophthalate, 6 g. of ethyleneglycol, 4 g. of glycerine and 0.01 g. of lead acetate was heated at 120–130° C. while distilling off methanol formed as a by-product. When the distillation of methanol was almost completed, the heating temperature was elevated to 200° C. The total heating time was 10 hours. The resulting resinous product was mixed with the above reaction mixture, and the mixture was heated at 150° C. for 30 minutes, following which 0.1 g. of dibutyl tin dilaurate was added to the reaction mixture and it was diluted with methylethylketone so that the solid content was 35% by weight. The so obtained varnish was coated on a copper plate, preliminarily dried, and baked at 300° C. for 2 minutes to obtain a tough coating having an excellence in flexibility.

Example 18

A three-neck flask of a 300-ml. capacity was charged with 19.2 g. (0.1 mole) of trimellitic anhydride, 19.8 g. (0.1 mole) of 4,4'-diphenylmethane and 50 g. of N-methylpyrrolidone, and in a nitrogen current they were heated at a bath temperature of 240–260° C. N-methylpyrrolidone was gradually distilled off to condense the reaction mixture, and at the final stage the reaction was conducted at a solid concentration of about 80% by weight. In such manner the reaction was continued for 3 hours, and after completion of the reaction, 80 g. of N-methylpyrrolidone were added to the reaction mixture.

A small quantity of the resulting solution was poured into water to separate a yellow reaction product. As a result of the terminal group determination conducted in the same manner as in Example 1, the reaction product was found to contain terminal amino groups in an amount of $6.4 \times 10^{-4}$ mole/g. The inherent viscosity of the reaction product was found to be 0.28.

The above reaction solution was incorporated with 6.43 g. (0.024 mole) of 4-phenyl trimellitate 1,2-anhydride and 10 ml. of xylene, and heated at a bath temperature of 180–200° C. Thus, a distillate composed mainly of water and xylene was allowed to come out of the reaction mixture. In such manner the reaction was carried out for 2 hours. After completion of the reaction, a small quantity of the resulting solution was poured into water to precipitate an intermediate condensate, which was then subjected to the infrared spectrum analysis. In the infrared spectrum definite absorptions appeared at 750 cm.$^{-1}$, 1000 cm.$^{-1}$ and 1280 cm.$^{-1}$, each of which was not observed in the infrared spectrum of the reaction product formed before addition of 4-phenyl trimellitate 1,2-anhydride. These absorptions were deemed to be due to the 4-phenoxycarbonyl-phthalimide group.

The above reaction mixture was incorporated with 6.26 g. (0.024 mole) of tris-(β-hydroxyethyl)-isocyanurate and 0.1 g. of dibutyl tin dilaurate, and the mixture was heated at 180° C. for 1 hour. The inherent viscosity of the resulting partial reaction product separated from the reaction solution was 0.34.

The resulting reaction solution was coated on a glass sheet, preliminarily dried at 150° C. for 30 minutes, and baked and hardened at 300° C. for 5 minutes to obtain a brown transparent film having a good flexibility.

Under similar conditions, the solution was coated on a copper plate, preliminarily dried, and baked and hardened to obtain a tough coating in which no cracks or peeling were caused when it was bent. From this test result, it was considered that the reaction solution obtained above could be used as a wire-enamelling varnish.

For comparison, a varnish solution was prepared by repeating the above procedures with use of 0.024 mole of trimellitic anhydride instead of 4-phenyl trimellitate 1,2-anhydride, and the solution was baked on a glass sheet in the same manner as above but it was impossible to obtain a film having a self-sustaining property. A coating formed on a copper sheet from this comparative solution in the same manner as above was readily cracked.

Example 19

A flask of a 300-ml. capacity was charged with 19.2 g. (0.1 mole) of trimellitic anhydride, 23.76 g. of 4,4'-diaminodiphenylmethane and 50 g. of N-methylpyrrolidone, and they were reacted for 5 hours in the same manner as in Example 18. Then, the reaction mixture was diluted by addition of 40 g. of N-methylpyrrolidone.

The reaction product separated from the above solution had an inherent viscosity of 0.18 and contained terminal amino groups in an amount of $1.35 \times 10^{-3}$ mole/g.

A mxture of 14.74 g. (0.055 mole) of 4-phenyl trimellitate 1,2-anhydride and 20 ml. of xylene was added to the above solution, and the mixture was heated at a bath temperature of 180–200° C. Water formed as a by-product was removed together with xylene.

The resulting precursor separated from the above reaction mixture had an inherent viscosity of 0.20.

Then, 7.47 g. of a polyphenylene-polymethylene-polyamine (condensate formed from aniline and formaldehyde) having an average degree of condensation of 2.5 were added to the above reaction mixture, and the mixture was heated for about 1 hour at a bath temperature of 240–260° C.

The resulting solution was coated on a glass sheet, preliminarily dried, and baked and hardened at 350° C. for 5 minutes. Thus was obtained a film having a good self-sustaining property. The heat resistance of the resulting film was measured in the air by employing a thermogravimetric balance at a temperature-elevating rate of 5° C./min. No appreciable weight decrease was observed at temperatures of up to 400° C. Thus, it was confirmed that the film had a good heat resistance.

Example 20

A three-neck flask of a 300-ml. capacity was charged with 19.2 g. (0.1 mole) of trimelitic anhydride, 21.78 g. (0.11 mole) of 4,4'-diaminodiphenylmethane and 50 g. of cresol, and they were heated in a nitrogen current at a bath temperature of 240–260° C.

Cresol was gradually distilled off, and at the final stage the reaction was carried out at a solid content of about 80% by weight. At the initial stage of the reaction the reaction mixture was heterogeneous, but with advance of the reaction the reaction mixture became a homogeneous solution. After completion of the reaction, the resulting solution was diluted with 80 g. of cresol. A small quantity of the resulting solution was poured into methanol to obtain a yellow reaction product, which was then subjected to the inherent viscosity measurement and the terminal group determination in the same manner as in Example 1. It was found that the product had an inherent viscosity of 0.20 and contained terminal amino groups in an amount of $9.02 \times 10^{-4}$ mole/g.

Then 9.65 g. (0.036 mole) of 4-phenyl trimellitate 1,2-anhydride were added to the above solution and the mixture was heated at a bath temperature of 200–210° C. A part of cresol was distilled off together with water formed as a by-product.

After completion of the reaction, a small quantity of the resulting intermediate condensate was separated by precipitation to determine the content of terminal amino groups. It was found that almost all of the terminal groups had been converted to 4-phenoxy-carbonyl-phthalimide groups by the above reaction.

6.35 g. (0.025 mole) of tris-($\beta$-hydroxyethyl)-isocyanurate and 0.2 g. of tetrabutyl titanate were added to the above reaction solution, and the mixture was heated at 180° C. for 30 minutes. The resulting cresol solution was coated on a copper plate, preliminarily dried, and baked at 300° C. for 5 minutes to obtain a lustrous coating which exhibited good adherence and flexibility.

Example 21

Under the same conditions as adopted in Example 20, a reaction product having an inherent viscosity of 0.23 and containing terminal amino groups in an amount of $1.26 \times 10^{-3}$ mole/g. was prepared from 19.2 g. (0.1 mole) of trimellitic anhydride, 14.85 g. (0.075 mole) of 4,4'-diamino-diphenylmethane, 6.23 g. of a polyphenylene-polymethylene-polyamine having an average degree of polycondensation of 2.5 and 50 g. of cresol. The resulting reaction mixture was diluted and it was reacted with 13.4 g. (0.05 mole) of 4-phenyl trimellitate 1,2-anhydride in the same manner as in Example 20. Then, the resulting reaction mixture was incorporated with 3.18 g. (0.01 mole) of diphenyl terephthalate, 10.44 g. (0.04 mole) of tris-($\beta$-hydroxyethyl)-isocyanurate and 0.2 g. of tetrabutyl titanate, and the mixture was heated at 180–200° C. for 30 minutes. The resulting solution was coated on a glass sheet, preliminarily dried, and baked at 300° C. for 5 minutes to obtain a film having a good self-sustaining property.

Example 22

A three-neck flask of a 300-ml. capacity was charged with 18.2 g. (0.095 mole) of trimellitic anhydride, 1.6 g. (0.005 mole) of benzophenone-tetracarboxylic dianhydride, 19.8 g. (0.1 mole) of 4,4'-diaminodiphenylmethane and 50 g. of N-methylpyrrolidone, and they were heated in a nitrogen current at a bath temperature of 240–260° C. During the heating, N-methylpyrrolidone was gradually distilled off, and at the final stage the reaction was carried out at a solid concentration of about 80% by weight. In such manner the reaction was continued for 3 hours, and 50 g. of N-methylpyrrolidone were added to the resulting reaction mixture.

A small quantity of the resulting N-methylpyrrolidone solution was poured into water to separate a yellow reaction product. It was found that the reaction product had an inherent viscosity of 0.30 and a terminal amino group content of $6.1 \times 10^{-4}$ mole/g.

Then, 6.4 g. of 4-phenyl trimellitate 1,2-anhydride and 10 g. of xylene were added to the above solution, and the mixture was heated at a bath temperature of 180–200° C. During the heating, a distillate composed mainly of water and xylene was allowed to come out of the reaction mixture.

After the reaction had been continued for 2 hours, a small quantity of the resulting reaction solution was poured into water to separate the resulting polyamide-imide precursor. In the infrared absorption spectrum of the precursor adsorptions characteristics of the 4-phenoxy-carbonyl-phthalimide group were observed at 750 cm.$^{-1}$, 1000 cm.$^{-1}$ and 1280 cm.$^{-1}$.

6.5 g. of tris($\beta$-hydroxyethyl)-isocyanurate and 0.1 g. of dibutyl tin dilaurate were added to the above reaction solution, and the mixture was heated at 180° C. for 20 minutes.

N-methylpyrrolidone and xylene were added to the resulting solution so that the non-volatile content was 30% by weight and the ratio of N-methylpyrrolidone: xylene is 4:1. The so formed varnish was coated on a copper plate polished by a sand paper, preliminarily dried at 150° C. for 30 minutes, and baked at 300° C. for 5 minutes. The resulting coating was very tough, and when it was bent, cracking or peeling did not occur.

For comparison, a varnish was prepared in the same manner as above except that instead of 4-phenyl trimellitate 1,2-anhydride, and equimolar amount of trimellitic anhydride was used. The varnish was coated on a copper plate and baked under the same conditions as above. The resulting coating was readily cracked when it was bent. From the foregoing, it will readily be understood that excellent effects are attained by employing a polyamide-imide precursor containing terminal aryl ester groups.

Example 23

172.8 g. (0.9 mole) of trimellitic anhydride were reacted with 53.6 g. (0.2 mole) of 4-phenyl trimellitate 1,2-anhydride, 225.0 g. (0.9 mole) of 4,4'-diphenylmethane diisocyanate and 17.4 g. (0.1 mole) of toluylene diisocyanate in 400 ml. of dehydrated N-methylpyrrolidone at 160° C. for 2 hours to obtain a redish brown, viscous solution.

A small quantity of the solution was poured into water to separate the reaction product, which was found to have an inherent viscosity of 0.21. In the infrared spectrum, absorptions characteristics of the 4-phenoxycarbonyl-phthalimide group were observed at 750 cm.$^{-1}$, 1000 cm.$^{-1}$ and 1280 cm.$^{-1}$ in addition to absorptions characteristics of amide and imide groups.

400 g. of the above solution were incorporated with 27 g. of tris-($\beta$-hydroxyethyl)-isocyanurate and 0.8 g. of dibutyl tin dilaurate, and the mixture was heated at 150° C. for 20 minutes under agitation. A part of the resulting solution was coated on a glass sheet, preliminarily dried at 150° C. for 2 hours and maked at 300° C. for 5 minutes to obtain a tough film having good flexibility.

The solution was diluted with dimethylacetamide and solvent naphtha to obtain a varnish having non-volatile content of 32% by weight. The varnish was coated on a soft copper wire having a conductor diameter of 1 mm. at 300–400° C. in a vertical test oven at a wire speed of 3 m./min. The above coating procedure was repeated 5–7 times to obtain an insulated electric wire.

The so obtained insulated electric wire had a softening point exceeding 350° C. as measured by the temperature-elevating method, an abrasion resistance of 120 strokes, and a good thermal shock resistance tested at 250° C. for 1 hour in the state wound on a rod having the same diameter as that of the insulated wire. Even after the insulated wire was aged at 200° C. for 24 hours, the coating exhibited good flexibility when tested in the state wound on a rod having the same diameter as that of the wire.

Example 24

100 g. of the solution obtained in the first part of Example 23 were taken, and 6.5 g. of a polyphenylene-polymethylene-polyamine having an average degree of polymerizaton of 2.5 were added to the solution. The resulting solution was heated at 180–200° C. for 1 hour and then cast on a glass sheet, following which the cast solution was preliminarily dried at 150° C. for 2 hours and baked at 350° C. for 3 minutes to effect the hardening. As a result, a film having a good self-sustaining property.

The resulting film was subjected to the thermogravimetric analysis in the air at a temperature-elevating rate of 5° C./min. At temperatures of up to about 400° C. a weight decrease was hardly observed. Thus, it was confirmed that the film had good heat resistance.

Example 25

The reaction was carried out under the same conditions as in Example 23 except that 153.6 g. (0.8 mole) of trimellitic anhydride, 107.2 g. (0.4 mole) of 4-phenyl trimellitate 1,2-anhydride, 400 ml. of N-methylpyrrolidone and 250 g. (1 mole) of 4,4'-diphenylmethane diisocyanate were used.

The resulting reaction mixture took a form of a homogeneous solution at high temperatures, but as the reaction mixture was cooled, a part of the reaction product was precipitated. A small quantity of the reaction solution was poured into water to separate the reaction product, which was found to have an inherent viscosity of 0.188.

100 g. of the above solution were taken while still maintained at a high temperature, and 12 g. of tris-($\beta$-hydroxyethyl)-isocyanurate and 0.2 g. of dibutyl tin dilaurate were added thereto. The mixture was then heated at 150° C. for 10 minutes. The resulting solution was coated on a glass sheet, preliminarily dried at 150° C. for 2 hours and baked at 300° C. for 5 minutes. A tough transparent film having good flexibility was obtained.

Example 26

A mixture of 172.8 g. (0.9 mole) of trimellitic anhydried, 26.8 g. (0.1 mole) of 4-phenyl trimellitate 1,2-anhydride, 250 g. (1 mole) of 4,4'-diphenylmethane diisocyanate, 9.4 g. (0.1 mole) of phenol and 400 ml. of N-methylpyrrolidone was heated under agitation at 120–160° C. for 1 hour and at 180° C. for another hour, to obtain a reddish brown solution. The resulting precursor contained in the solution was found to have an inherent viscosity of 0.39.

The above precursor solution was coated on a glass sheet, and dried at 150° C. for 2 hours and at 230° C. for 10 minutes, but a film having a self-retaining property was not obtained.

On the other hand, when 5 g. of tris-($\beta$-hydroxyethyl)-isocyanurate and 0.1 g. of dibutyl tin dilaurate were dissolved under heat in 100 g. of the above precursor and the resulting solution was coated on a glass sheet and dried in the same manner as above, a tough film having good flexibility was obtained.

Example 27

The reaction was carried out in the same manner as in Example 23 except that a mixture consisting of 90 mole percent of trimellitic anhydride and 10 mole percent of benzophenone-tetracarboxylic acid was used instead of trimellitic anhydride used in Example 23. The resulting solution was reacted with tris-($\beta$-hydroxyethyl)-isocyanurate in the same manner as in Example 23. When the resulting solution was coated on a glass sheet and baked in the same manner as in Example 23, a tough film having a good flexibility was obtained.

Example 28

53.6 g. (0.2 mole) of 4-phenyl trimellitate 1,2-anhydride, 153.6 g. (0.8 mole) of trimellitic anhydride and 16.6 g. (0.1 mole) of isophthalic acid were dissolved in 400 ml. of dehydrated N-methylpyrrolidone, following which 250.0 g. (1.0 mole) of 4,4'-diphenylmethane diisocyanate were added to the solution. The mixture was gradually heated and at 160° C. and the reaction was carried out for about 2 hours to obtain a reddish brown viscous solution.

A s mall quantity of the resulting solution was poured into water, and the precipitated reaction product was separated and dried. As a result of the inherent viscosity measurement it was found that the reaction product had an inherent viscosity of 0.22.

The above solution was coated on a halite plate and dried well to expel the solvent therefrom, and the infrared absorption spectrum analysis was conducted. Absorptions characteristic of the 4-phenoxycarbonylphthalimide group were observed at 750 cm.$^{-1}$, 1000 cm.$^{-1}$ and 1280 cm.$^{-1}$ in addition to adsorptions characteristic of amide and imide groups.

The so-obtained polyamideimide precursor containing terminal 4-phenoxycarbonyl-phthalimide groups failed to provide a film having a self-sustaining property when the above precursor solution was coated on a glass sheet and dried at 150° C. for 2 hours and at 300° C. for 5 minutes. When the above solution was coated on an aluminum plate and baked under similar conditions, only a coating which was readily cracked under bending was obtained.

100 g. of the above precursor solution were incorporated with 7 g. of tris-($\beta$-hydroxyethyl)-isocyanurate and 0.2 g. of dibutyl tin dilaurate and the mixture was heated at 150° C. for 10 minutes under agitation. The reaction mixture was diluted with N,N-dimethylacetamide and methylethylketone so that the non-volatile content was 25% by weight, to thereby obtain a coating paint. The so obtained coating paint was coated on an aluminum plate of a thickness of 0.8 mm. by means of a spray gun, followed by preliminary drying. The above coating and drying procedures were repeated to obtain a coating having a thickness of about 40$\mu$. The coating was baked at 300° C. for 4 minutes.

Mechanical and electrical properties of the so obtained coating are shown in Table 3, from which it is seen that the coating had a well-balanced combination of desired properties.

TABLE 3.—PROPERTIES OF COATING

| Item | Measurement result | Remarks |
| --- | --- | --- |
| Adherence | 100/100 (no peeling) | Cross-cut adhesive cellophane tape peeling method. |
| Flexibility | Good (2 mm. diameter). | Mandrel test. |
| Hardness | 5H | Pencil hardness. |
| Erichsen value | 5.9 mm | Extruded distance before cracking. |
| Softening point | Above 350° C | Tested according to JIS 3211. |
| Insulation breakdown voltage | 155 kv./mm | |
| Volume resistivity | 5.2×10$^{15}$ ohm-cm | |

Example 29

192 g. (1.0 mole) of trimellitic anhydride, 26.8 g. (0.1 mole) of 4-phenyl trimellitate 1,2-anhydride, 82 g. (0.5 mole) of toluylene diisocyanate and 125 g. (0.5 mole) of 4,4'-diphenylmethane diisocyanate were dissolved in 40 ml. of N-methylpyrrolidone, and they were reacted under the same conditions as in Example 23. The reaction product contained in the resulting solution was found to have an inherent viscosity of 0.27, and in the infrared spectrum of the product, absorptions characteristic of the 4-phenyloxycarbonyl-phthalimide groups were observed as in Example 23.

The resulting solution was coated on a copper plate, dried at 150° C. for 2 hours and baked at 300° C. for 5 minutes. When the coated copper plate was bent, the coating was readily peeled off.

5 g. of tris-($\beta$-hydroxyethyl)-isocyanurate and 0.2 g. of dibutyl tin dilaurate were dissolved under heat into 100 g. of the above solution, and the resulting solution was coated on a copper plate, dried at 150° C. for 2 hours and baked at 300° C. for 5 minutes. A coating excellent in flexibility and adherence which was not cracked under bending was obtained.

Example 30

A mixture of 8.64 g. (0.045 mole) of trimellitic anhydride, 3.87 g. (0.010 mole) of 4-phenoxycarbonyl-N-(3-carboxyphenyl)-phthalimide and 5.0 g. of N-methylpyrrolidone was heated at 80° C., and to the mixture 12.50 g. (0.05 mole) of 4,4'-diphenylmethane diisocyanate were added. The reaction was carried out at 170–180° C. for 3 hours to obtain a brown homogeneous solution. A small quantity of the solution was poured into water, and the precipitated reaction product was separated. As a result of the inherent viscosity measurement of the product, it was found that the separated product had an inherent viscosity of 0.25.

In the infrared spectrum of the above reaction product, absorptions characteristic of the 4-phenoxycarbonyl-phthalimide group were observed at 750 cm.$^{-1}$, 1000 cm.$^{-1}$ and 1280 cm.$^{-1}$ in addition to absorptions characteristic of amide and imide groups.

The above precursor solution was incorporated with 1.31 g. (0.005 mole) of tris-($\beta$-hydroxyethyl)-isocyanurate and the mixture was heated at 150° C. for 1 hour, followed by addition of 0.2 g. of dibutyl tin dilaurate. The mixture was similarly heated at 150° C. for 1 hour. The reaction product contained in the resulting solution was found to have an inherent viscosity of 0.29.

The so formed solution was coated on a glass sheet, preliminarily dried at 150° C. for 1.5 hours and baked at 300° C. for 5 minutes to obtain a brown film having a good self-retaining property.

Example 31

The reaction was carried out in the same manner as in the first part of Example 30 except that a mixture consisting of 90 mole percent of trimellitic anhydride and 10 mole percent of benzophenone-tetracarboxylic dianhydride was employed instead of trimellitic anhydride used in Example 30. As a result, a reaction solution containing a polyamideimide precursor terminated with 4-phenoxycarbonyl-phthalimide groups was obtained. The solution was incorporated with 1.25 g. (0.005 mole) of a polyphenylene-polymethylene - polyamine (starting amine for crude MDI) having an average degree of polymerization of 2.5, and the mixture was heated at 200° C. for 1.5 hours. The resulting solution was cast on a glass sheet, and heated at 150° C. for 2 hours and at 350° C. for 3 minutes to effect hardening. As a result, a film having a good self-sustaining property was obtained.

Example 32

In the same manner as in the first part of Example 30, 8.64 g. (0.045 mole) of trimellitic anhydride, 3.87 g. (0.010 mole) of 4-phenoxycarbonyl-N-(3-carboxyphenyl)-phthalimide and 12.50 g. (0.05 mole) of 4,4'-diphenylmethane diisocyanate were reacted in 50 ml. of N-methylpyrrolidone, and the bath temperature was raised to 250° C. and N-methylpyrrolidone was gradually distilled off. When 45 ml. and N-methylpyrrolidone were distilled off, 55 g. of cresol were gradually added to the resulting brown viscous dope. Thus, the dope was dissolved homogeneously in cresol.

Then, 1.31 g. of tris-($\beta$-hydroxyethyl)-isocyanurate was added to the solution, and it was heated at 150° C. for 1 hour. Then, 0.2 g. of tetrabutyl titanate was added to the reaction mixture. Thus, a reddish brown homogeneous solution was obtained. The resulting partial reaction product contained in the solution was found to have an inherent viscosity of 0.37.

The so formed solution was coated on a copper plate, preliminarily dried at 150° C. for 1.5 hours and baked at 300° C. for 5 minutes to obtain a lustrous tough coating. When the coated copper plate was bent, or when the coated copper plate subjected to the cross-cut adhesive cellophane tape pelling test, cracking or peeling did not occur. Thus, it was confirmed that the resulting coating had good adherence and flexibility.

Example 33

Procedures of Example 30 were repeated except that N-(3-carboxyphenyl)-trimellitic imide formed by reacting trimellitic anhydride with m-aminobenzoic acid was used instead of trimellitic anhydride employed in Example 30. The resulting solution was cast on a glass sheet and baked. The resulting film had good flexibility. When the solution was coated on a copper plate and baked, a coating exhibiting good adherence was obtained.

Example 34

A mixture of 19.2 g. (0.1 mole) of trimellitic anhydride, 19.8 g. (0.1 mole) of 4,4'-diaminodiphenylmethane and 50 g. of N-methylpyrrolidone was heated in a nitrogen current at a bath temperature of 240–260° C. The reaction mixture was gradually condensed by distilling off N-methylpyrrolidone gradually, and at the final stage the reaction was continued at a solid concentration of about 80% by weight. In such manner the reaction was conducted for 3 hours. After completion of the reaction, 80 g. of N-methylpyrrolidone were added to the reaction mixture.

A small quantity of the above N-methylpyrrolidone solution was poured into water to separate a yellow reaction product, which was found to contain terminal amino groups in an amount of $6.6 \times 10^{-4}$ mole/g. and to have an inherent viscosity of 0.27.

A mixture of 6.43 g. (0.024 mole) of 4-phenyl trimellitate 1,2-anhydride and 10 ml. of xylene was added to the above solution, and the bath temperature was raised to 180–200° C., whereby a condensate composed mainly of water and xylene was allowed to come out of the reaction mixture. At the above temperature the reaction was continued for 2 hours. A small quantity of the resulting reaction mixture was poured into water to separate the reaction product. In the infrared spectrum of the product, absorptions characteristic of the 4-phenoxycarbonyl-phthalimide group were observed at 750 cm.$^{-1}$, 1000 cm.$^{-1}$ and 1280 cm.$^{-1}$.

3.0 g. (0.012 mole) of 4,4'-diphenylmethane diisocyanate added to the above solution, and the mixture was reacted at a bath temperature of 170° C. for 3 hours.

A small quantity of the resulting reaction solution was poured into water to separate the reaction product, which was found to have an inherent viscosity of 0.37.

The terminal carboxylic group content was measured to be $0.47 \times 10^{-4}$ mole/g., and almost all of the carboxyl groups present at the beginning were converted to amide linkages. Thus it was confirmed that the resulting precursor was characterized in that almost all of the terminal groups were 4-phenoxycarbonyl-phthalimide groups.

The resulting reaction solution was incorporated with 3.13 g. of tris-($\beta$-hydroxyethyl)-isocyanurate and 0.1 g. of dibutyl tin dilaurate, and the mixture was heated at 180° C. for 1 hour. The so formed solution was coated on a glass sheet, preliminarily dried, and baked at 300° C. for 5 minutes to obtain a film having a good self-sustaining property. The solution was also coated on a copper plate and baked under similar conditions to obtain a lustrous tough coating in which cracking or peeling did not occur even when the coated plate was bent. Thus, it was confirmed that the solution obtained in this Example could be used as a varnish for manufacture of insulated electric wires.

Example 35

A reaction product having an inherent viscosity of 0.23 and containing terminal amino and carboxyl groups in amounts of $4.01 \times 10^{-4}$ mole/g. and $9.9 \times 10^{-4}$ mole/g., respectively, was poured under the same reaction conditions as in Example 34 except that 19.2 g. (0.1 mole) of trimellitic anhydride and 17.82 g. (0.09 mole) of 4,4'- diaminodiphenylmethane were used. Next, the above reaction product was further reacted with 4.02 g. (0.015 mole) of 4-phenyl trimellitate 1,2-anhydride and 4.50 g. (0.018 mole) of 4,4'-diphenylmethane diisocyanate under the same conditions as in Example 34 to obtain a polyamideimide precursor having an inherent viscosity of 0.41 and containing terminal carboxyl and amino groups in amounts of $0.58 \times 10^{-4}$ mole/g. and $0.41 \times 10^{-4}$ mole/g., respectively.

The reaction solution containing the above precursor was incorporated with 2 g. of polyphenylene-polymethylene-polyamine having an average molecular weight of 249 (condensate formed from aniline and formaldehyde), and the mixture was heated at a bath temperature of 200–220° C. for 3 hours.

The resulting solution was coated on a glass sheet, preliminarily dried, and baked at 350° C. for 5 minutes to obtain a film having a good self-sustaining property. When the film was subjected to the thermogravimetric analysis in the air at a temperature-elevating rate of 5° C./min., substantially no weight decrease was observed at temperatures of up to about 400° C. Thus it was confirmed that the film obtained in this Example had good heat resistance.

Example 36

A three-neck flask of a 2-1. capacity was charged with 198 g. (1 mole) of 4,4'-diaminodiphenylmethane and 400 g. of N-methylpyrrolidone, and 192 g. (1 mole) of trimellitic anhydride were gradually added to the above mixture at 100° C. under agitation, followed by addition of 100 g. of xylene. The mixture was heated at a bath temperature elevated to 180–200° C. while water formed as a by-product was removed by azeotropic distillation with xylene. The reaction was continued for about 3 hours at a bath temperature of 200° C., following which the bath temperature was lowered to 100° C. Then, 31.3 g. (0.125) of 4,4'-diphenylmethane diisocyanate were added to the reaction mixture, and the bath temperature was raised to 240–260° C. to condense the reaction mixture until the solid concentration was 70% by weight. Then, the reaction was continued under reflux at the above temperature for 5 hours. The inside temperature was 218° C. and the reaction mixture was a slightly-turbid, viscous liquid, which was then converted to a homogeneous solution by addition of 700 g. of N-methylpyrrolidone.

A small quantity of the solution was taken and added into water to separate the resulting condensate, on which the inherent viscosity measurement and the terminal carboxyl group determination were conducted.

The condensate was found to have an inherent viscosity of 0.32 and to contain terminal amino and carboxyl groups in amounts of $4.3 \times 10^{-4}$ mole/g. and $0.6 \times 10^{-4}$ mole/g., respectively.

The above solution was incorporated with 67 g. (0.25 mole) of trimellitic anhydride, 11.9 g. (0.1 mole) of 2-amino-2-methyl-propanediol and 100 g. of xylene, and the mixture was heated at a bath temperature of 180–200° C. while removing water formed as a by-product by azeotropic distillation with xylene, following which 2 g. of dibutyl tin dilaurate were added to the reaction mixture and the reaction was continued at 180° C. for 1 hour.

When the so formed reaction solution was coated on a glass sheet, preliminarily dried and baked at 300° C. for 5 minutes, a film having good self-sustaining property and flexibility was obtained.

Examples 37–46

Polyamideimide precursors and shaping compositions were prepared according to procedures illustrated in preceding Examples by employing reactants indicated in Table 4. In each Example a precursor having good hardenability was obtained, and it provided a flexible film after the hardening operation.

Abbreviations in Table 4 have the following meaning.

PTA: 4-phenyl trimellitate 1,2-dianhydride
MDA: 4,4'-diaminodiphenylmethane
THEIC: tris-(β-hydroxyethyl)-isocyanurate
TBT: tetra-n-butyl titanate
DBTD: di-n-butyl tin dilaurate
N-MP: N-methylpyrrolidone
TMS: tetramethylenesulfone
NNDA: N,N-dimethylacetamide

TABLE 4

| Ex. No. | Precursor Starting reactants | Amount (mole) | Reaction solvent | Inherent viscosity | Aryl-esterification degree in terminal groups, percent | Hardening agent (mole) | Catalyst | Film-forming property (hardened at 300° C. for 5 minutes) | Number of example operations according to which were conducted |
|---|---|---|---|---|---|---|---|---|---|
| 37 | PTA<br>MDA<br>m-Xylylenediamine | 0.15<br>0.10<br>0.035 | Cresol | 0.18 | 72 | THEIC (0.015) | TBT | Good | 15 |
| 38 | PTA<br>4,4'-diaminodicyclohexylamine | 0.15<br>0.135 | do | 0.21 | 77 | 2-amino-2-methyl-1,3-propanediol (0.015) | TBT | do | 15 |
| 39 | PTA<br>4,4'-diaminodiphenyl ether<br>3,3'-diamodiphenyl sulfone | 0.15<br>0.09<br>0.045 | do | 0.16 | 70 | THEIC (0.015) | TBT | do | 15 |
| 40 | Trimellitic anhydride<br>MDA<br>N-(2-hydroxy-1-hydroxymethyl-1-methylethyl)-tritrimellimide | 1.50<br>1.40<br>0.30 | do | 0.14 | | | TBT | do | 9 |
| 41 | 2-methyl trimellitate<br>MDA<br>m-Aminobenzoic acid | 0.15<br>0.135<br>0.03 | N-MP | 0.25 | 58 | 2-amino-2-methyl-1,3-propanediol (0.015) plus THEIC (0.015) | DBTD | do | 5 |
| 42 | 4-phenyl 2-methyl trimellitate<br>Phenyl m-aminobenzoate<br>MDA<br>Hexamethylenediamine | 0.15<br>0.03<br>0.12<br>0.015 | Cresol | 0.17 | 70 | THEIC (0.15) | TBT | do | 15 |
| 43 | Diphenylsulfone-3,4,4'-tricarboxylic anhydride<br>4,4'-diphenylmethane diisocyanate<br>PTA | 0.135<br>0.15<br>0.03 | N-MP | 0.25 | 93 | THEIC (0.01) | DBTD | do | 25 |
| 44 | Trimellitic anhydride<br>4,4'-diphenylmethane diisocyanate<br>Toluylene diisocyanate<br>PTA | 0.135<br>0.135<br>0.015<br>0.03 | TMS | 0.24 | 92 | THEIC (0.01) | DBTD | do | 23 |
| 45 | Trimellitic anhydride<br>4,4'-diphenylmethane diisocyanate<br>Toluylene diisocyanate<br>PTA | 0.135<br>0.135<br>0.015<br>0.03 | NNDA | 0.20 | 90 | THEIC (0.01) | DBTD | do | 23 |

TABLE 4—Continued

| Ex. No. | Precursor Starting reactants | Amount (mole) | Reaction solvent | Inherent viscosity | Aryl-esterification degree in terminal groups, percent | Hardening agent (mole) | Catalyst | Film-forming property (hardened at 300° C. for 5 minutes) | Number of example according to which operations were conducted |
|---|---|---|---|---|---|---|---|---|---|
| 46 | Trimellitic anhydride<br>MDA<br>Toluylenediamine<br>Bis-(β-hydroxyethyl)-terephthalate) | 1.5<br>1.05<br>0.15<br>0.2 | Cresol | 0.13 | 50 | THEIC (0.3) | TBT | do | 8 |

What we claim is:

1. A polyamideimide precursor in which at least 50 mole percent of the total structural units are aromatic amideimide structural units expressed by the following formula (1)

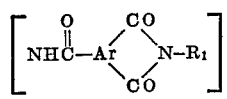

wherein Ar represents an aromatic group and $R_1$ is an organic radical having a valency of at least two, and at least 30 mole percent of the total terminal groups are carboxylic acid aryl ester groups having the formula

Z—OOC— wherein Z is selected from at least one of phenyl, cresyl, xylenyl, nitrophenyl, halogenophenyl, pyridyl, or naphthyl groups, said polyamideimide precursor having an inherent viscosity of 0.01 to 0.30 calculated from the value as measured at 30° C. as a solution of the polymer in N-methylpyrrolidone having a concentration of 0.5 g. polymer per 100 ml. of the solution.

2. The polyamideimide precursor of claim 1, wherein said polyamideimide precursor consists of the following units A, B and C:

(A) a linkage structure selected from the group consisting of an amideimide linkage expressed by the following formula

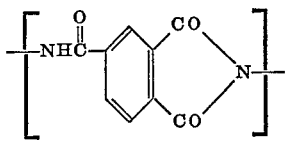

an amide linkage expressed by the formula

—NHCO— an ester linkage expressed by the formula

an imide linkage expressed by the following formula

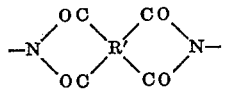

wherein R' is a tetravalent organic group having 4 to 15 carbon atoms, and an ester-imide linkage expressed by the following formula

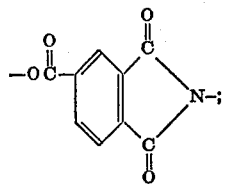

(B) hydrocarbon residues having a valency of at least two, which may have a bonding linkage, other than those included in (A) above, containing atoms other than carbon; and (C) terminal group; at least 50 mole percent of the units (A) being those having a structure of said amideimide linkage; said terminal groups (C) being atomic groups selected from the group consisting of carboxylic acid aryl ester groups, lower alkyl ester groups having up to 3 carbon atoms, cyclic carboxylic anhydride groups, carboxyl groups, carboxylic acid amide groups, primary and secondary amino groups, hydroxyl groups, isocyanate groups, carbamic acid groups and carbamic acid amide groups; and at least 30 mole percent of said terminal groups being carboxylic acid aryl ester groups.

3. A hardenable shaping composition comprising (1) a mixture of (i) a polyamideimide precursor as defined in claim 1 and (ii) a polyfunctional compound containing in the molecule at least two reactive groups selected from alcoholic hydroxyl groups and primary and secondary amino groups, the amount of said polyfunctional compound being such that the total number of alcoholic hydroxyl groups, amino groups or combination thereof contained in said polyfunctional compound is not smaller than the total number of carboxylic acid aryl ester groups contained in said polyamideimde precursor, or (2) a partial reaction product formed from said precursor (i) and polyfunctional compound (ii).

4. A hardenable shaping composition comprising (1) a mixture of (i) a polyamideimide precursor as defined in claim 1 and (ii) a polyfunctional compound containing in the molecule at least two reactive groups selected from alcoholic hydroxyl groups and primary and secondary amino groups, the amount of said polyfunctional compound being such that the total number of alcoholic hydroxyl groups, amino groups or combination thereof contained in the polyfunctional compound is not smaller than the total number of carboxylic acid aryl ester groups contained in said polyamideimide precursor, or (2) a partial reaction product formed from said polyamideimide precursor (i) and polyfunctional compound (ii), and (3) an organic solvent in an amount at least sufficient to dissolve the mixture (1) or partial reaction product (2) completely therein.

5. The shaping composition of claim 3, wherein said composition further includes a hardening catalyst in an amount of 0.005 to 10% by weight based on the weight of the mixture of said precursor and polyfunctional compound or the partial reaction product formed from said precursor and polyfunctional compound.

6. The shaping composition of claim 3, wherein said polyamideimide precursor is characterized in that the main chain is constructed of 50 to 100 mole percent of the structural units expressed by the following formula (5)

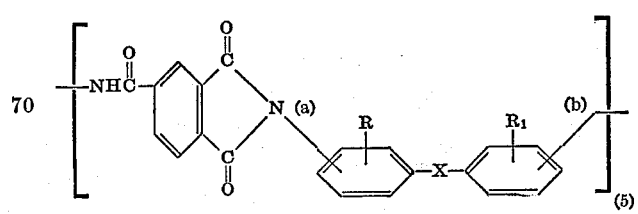

wherein X represents a lower alkylene group having 1 to 4 carbon atoms, —O—, —SO$_2$ or $$-\overset{O}{\underset{\|}{C}}-$$

bonds (a) and (b) are at the 4,4'-position, 3,3'-position or 3,4'-position of the radical ⌬—X—⌬, and R and R', which may be the same or different, represent a hydrogen atom, an alkyl group of 1–3 carbon atoms, an alkoxy group of 1–3 carbon atoms or a halogen atom,
and up to 50 mole percent of the structural units expressed by the following formula (6)

[structure (6)]

wherein bonds (c) and (d) are at the meta-position, para-position or both of the phenylene group, and R is as defined in the above formula (5),
or structural units expressed by the following formula (7)

[structure (7)]

wherein Y represents an alkylene or aralkylene group having 4–10 carbon atoms, or a combination of structural units of formulas (6) and (7),
and the terminal group of said polyamideimide precursor being selected from groups expressed by the following formulas (8–1), (8–2), (8–3), (8–4) and (8–5)

[structure (8–1)]

—NH$_2$ (8–2)

—NHC(=O)—O—⌬ with R (8–3)

—OH (8–4)

and
—COOH (8–5)

at least 40 mole percent of the total terminal groups being the terminal groups expressed by formula (8–1)

7. The shaping composition of claim 3, wherein said polyamideimide precursor is characterized in that the main chain is constructed of 5 to 30 mole percent of the structural units selected from those expressed by the following formulas (9), (10), (11) and (12)

[structure (9)]

wherein bonds (e) and (f) are at the meta-position, para-position or both of the phenylene group, and Z is a group selected from

[structure with (a) R, X, R' (b)]

wherein R and R', which may be the same or different, represent a hydrogen atom, an alkyl group of 1–3 carbon atoms, an alkoxy group of 1–3 carbon atoms or a halogen atom, X represents a lower alkylene group having 1 to 4 carbon atoms, —O—, —SO$_2$ or $-\overset{O}{\underset{\|}{C}}-$, and bonds (a) and (b) are at the 4,4'-position, 3,3'-position or 3,4'-position of the radical

⌬—X—⌬,

[structure with (c)(d) and R]

wherein R is a defined above and bonds (c) and (d) are at the meta-position, para-position or both of the phenylene group, and —Y— wherein Y represents an alkylene or aralkylene group having 4–10 carbon atoms;

[structure (10)]

wherein R$_7'$ is a group selected from

[phenylene structure]

[structure with C=O] and [structure with SO$_2$], and

Z is as defined above,

[structure (11)]

wherein bonds (g) and (h) are at the meta-position, para-position or both of the phenylene group, R$_6'$ is a divalent, trivalent or tetravalent aliphatic residue having 2–9 carbon atoms, n is 2, 1 or 0, and when n is 0, ‑(O)$_n$ represents a hydrogen atom, and

[structure (12)]

wherein m represents 1 or 0, when m is 0, bond (m) is a hydrogen atom, when m is 1, bond (m) is a single bond, and Z, $R_6'$ and $(O)_n$ are as defined above,
and 95 to 70 mole percent of the structural units expressed by the following formula (13)

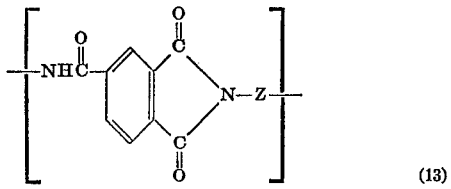

wherein Z is as defined above.

8. A process for the preparation of aromatic polyamideimide precursors in which at least 30 mole percent of the total terminal groups are carboxylic acid aryl esters, which comprises reacting (1) an aromatic tricarboxylic acid expressed by the following formula (1″)

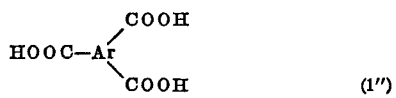

wherein Ar represents a trivalent aromatic group, each of the three carboxyl groups being bonded to the nuclear carbon atom of the aromatic group Ar, and two of said three carboxyl groups being bonded to nuclear carbon atoms of said aromatic group at such a position that they can form a cyclic acid anhydride group

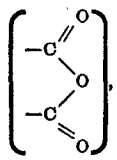

or an anhydride or monoester of said aromatic tricarboxylic acid in which one of the two carboxyl groups capable of forming an acid anhydride group is esterified, (2) a di-, tri- or tetra-functional, aromatic, aliphatic or alicyclic polyamide and/or a di-, tri- or tetrafunctional, aromatic, aliphatic or alicyclic polyisocyanate, and (3) a diaryl carbonate, the ratio of the reactants (1) and (2) being such that, on the basis that said reactant (1) has one carboxylic group and one dicarboxylic anhydride group, the total number of the carboxyl groups and carboxylic anhydride groups of said reactant (1) is at least equimolar to the total number of the amino groups and/or isocyanate groups of said reactant (2), the polymerization being continued until the resulting precursor has an inherent viscosity of 0.1 to 0.3 calculated from the value as measured at 30° C. as a solution of the polymer in N-methylpyrrolidone having a concentration of 0.5 g. polymer in 100 ml. of the solution.

9. A process for the preparation of polyamideimide precursors according to claim 8, wherein in addition to reactants (1), (2) and (3), at least one member selected from the group consisting of (4) aromatic, aliphatic and alicyclic polycarboxylic acids having 2 to 4 functional groups and derivatives thereof, compound (4) not being included in said reactant (1), and (5) aromatic, aliphatic and alicyclic polyols, aminohydroxyl compounds, aminocarboxylic acids and hydroxycarboxylic acids having 2 to 4 functional groups, and functional derivatives thereof, is further reacted, and the amounts of the reactants are such that, on the basis that reactant (1) has one carboxyl group and one cyclic carboxylic anhydride group, the total number of carboxyl groups and cyclic acid anhydride groups contained in the starting reactant mixture is at least equimolar to the total number of amino groups, isocyanate groups and mixtures thereof contained in the starting reactant mixture.

10. A process for the preparation of aromatic polyamideimide precursors in which at least 30 mole percent of the total terminal groups are carboxylic acid aryl ester groups, which comprises reacting (1) an aromatic tricarboxylic monoanhydride monoaryl ester expressed by the following formula (1‴)

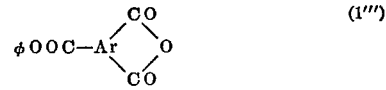

wherein Ar represents a trivalent aromatic group, the carboxyl and carboxylic anhydride groups are bonded to nuclear carbon atoms of the aromatic group Ar, and $\phi$ represents a monovalent aromatic group,
a functional derivative thereof or mixtures thereof and (2) an aromatic, aliphatic or alicyclic polyamine having 2 to 4 functional groups, optionally together with (3) an aromatic, aliphatic or alicyclic polycarboxylic acid having 2 to 4 functional groups, a functional derivative thereof or mixture thereof and (4) an aromatic, aliphatic or alicyclic polyol, aminohydroxyl compound, aminocarboxylic acid or hydroxycarboxylic acid having 2 to 4 functional groups, a functional derivative thereof or mixture thereof, the amounts of the reactants being such that the total number of carboxylic acid aryl ester groups, dicarboxylic anhydride groups, carboxylic groups and mixture thereof contained in the starting reactant mixture is at least equimolar to the number of amino groups contained in the starting reactant mixture, the polymerization being continued until the resulting precursor has an inherent viscosity of 0.05 to 0.45 calculated from the value as measured at 30° C. as a solution of the polymer in N-methylpyrrolidone having a concentration of 0.5 g. polymer per 100 ml. of the solution.

11. A process for the preparation of aromatic polyamideimide precursors in which at least 30 mole percent of the total terminal groups are carboxylic acid aryl ester groups, which comprises reacting (1) an aromatic tricarboxylic acid expressed by the following formula (1″)

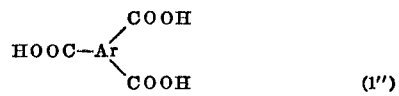

wherein Ar represents a trivalent aromatic group, each of the three carboxyl groups is bonded to the nuclear carbon atom of the aromatic group Ar, and two of said three carboxyl groups are bonded to nuclear carbon atoms of said aromatic group at such a position that they can form a cyclic acid anhydride group

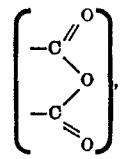

or a cyclic anhydride or monoester in which one of the two carboxyl groups capable of forming a cyclic acid anhydride group is esterified, and (2) an aromatic, aliphatic or alicyclic polyamine having a valency of two to four, optionally together with (3) an aromatic, aliphatic or alicyclic polycarboxylic acid having 2 to 4 functional groups, a functional derivative thereof or mixture thereof, (4) an aromatic, aliphatic or alicyclic polyol, aminohydroxyl compound, aminocarboxylic acid and hydroxycarboxylic acid having 2 to 4 functional groups, a functional derivative thereof or mixture thereof, or a mixture of (3) and (4), the amounts of the reactants being such that, on the basis that said reactant (1) has one carboxyl group and one cyclic carboxylic anhydride group, the number of amino groups contained in the starting reactant mixture is 1 to 2 molar times the total number of carboxyl groups and acid anhydride groups contained in the starting reactant mixture, to thereby form a precondensate, and then reacting the so formed precondensate with (5) an aromatic tricarboxylic monoanhydride monoaryl ester expressed by the following formula (1''')

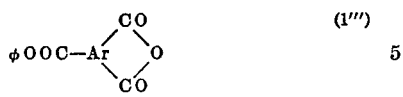

wherein Ar represents a trivalent aromatic group, the carboxyl and carboxylic anhydride groups are bonded to nuclear carbon atoms of the aromatic group, Ar, and φ represents a monovalent aromatic group,
a functional derivative thereof or mixture thereof, the amount of reactant (5) being at least 30 mole percent of the total terminal groups of the formed precursor, the polymerization being continued until the resulting precursor has an inherent viscosity of 0.05 to 0.45 calculated from the value as measured at 30° C. as a solution of the polymer in N-methylpyrrolidone having a concentration of 0.5 g. polymer per 100 ml. of the solvent.

12. A process for the preparation of aromatic polyamideimide precursors in which at least 30 mole percent of the total terminal groups are carboxylic acid aryl ester groups, which comprises reacting (1) an aromatic tricarboxylic anhydride expressed by the following formula (1'')

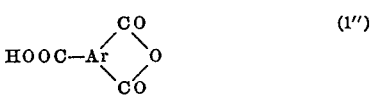

wherein Ar represents a trivalent aromatic group, and the carboxyl and carboxylic anhydride groups are bonded to nuclear carbon atoms of the aromatic group Ar,
(2) an aromatic tricarboxylic monoanhydride monoaryl ester expressed by the following formula (1''')

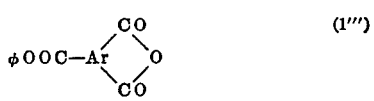

wherein Ar represents a trivalent aromatic group, the carboxyl and carboxylic anhydride groups are bonded to nuclear carbon atoms of the aromatic group Ar, and φ represents a monovalent aromatic group,
a dicarboxylic acid monoaryl ester or mixture thereof, and (3) an aromatic, aliphatic or alicyclic polyisocyanate having 2 to 4 functional groups, optionally together with (4) an aromatic, aliphatic or alicyclic polycarboxylic acid having 2 to 4 functional groups, component (4) not being included in said reactant (1), the polymerization being continued until the resulting precursor has an inherent viscosity of 0.05 to 0.45 calculated from the value as measured at 30° C. as a solution of the polymer in N-methylpyrrolidone having a concentration of 0.5 g. polymer per 100 ml. of the solution.

13. A process for the preparation of aromatic polyamideimide precursors in which at least 30 mole percent of the total terminal groups are carboxylic acid aryl ester groups, which comprises reacting (1) an aromatic tricarboxylic acid expressed by the following formula (1'')

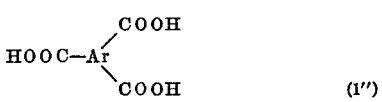

wherein Ar represents a trivalent aromatic group, each of the three carboxyl groups is bonded to the nuclear carbon atom of the aromatic group Ar, and two of said three carboxyl groups are bonded to nuclear carbon atoms of said aromatic group at such a position that they can form a cyclic acid anhydride group

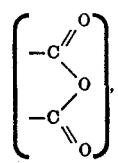

or an anhydride or monoester thereof in which one of the two carboxyl groups capable of forming an acid anhydride group is esterified, (2) an aromatic, aliphatic of alicyclic polyamine having 2 to 4 functional groups and an aromatic, aliphatic or alicyclic polyisocyanate having 2 to 4 functional groups, and (3) an aromatic tricarboxylic monoanhydride monoaryl ester expressed by the following formula (1''')

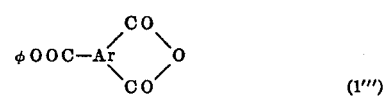

wherein Ar represents a trivalent aromatic group, the carboxyl and carboxylic anhydride groups are bonded to nuclear carbon atoms of the aromatic group Ar, and φ stands for a monovalent aromatic group,
a functional derivative thereof or mixture thereof, optionally together with (4) an aromatic, aliphatic or alicyclic polycarboxylic acid having 2 to 4 functional groups, component (4) not being included in said reactant (1), a functional derivative thereof or mixture thereof, (5) an aromatic, aliphatic or alicyclic polyol, aminohydroxyl compound, aminocarboxylic acid or hydroxycarboxylic acid having 2 to 4 functional groups, a functional derivative thereof or mixture thereof, or a mixture of (4) and (5), the amounts of the reactants being such that the total number of amino and isocyanate groups is 1 to 2 molar times the total number of carboxyl groups and cyclic acid anhydride groups of the reactants other than said reactant (3), the polymerization being continued until the resulting precursor has an inherent viscosity of 0.05 to 0.45 calculated from the value as measured at 30° C. as a solution of the polymer in N-methylpyrrolidone having a concentration of 0.5 g. polymer per 100 ml. of the solvent.

14. The process of claim 8, wherein the polymerization reaction is carried out in a solvent selected from di-substituted amides.

15. The process of claim 8, wherein the polymerization reaction is carried out in a phenolic solvent.

16. A wire-enamelling liquid composition comprising (i) a mixture of the polyamideimide precursor of claim 1 and a polyfunctonal compound containing in the molecule at least two reactive groups selected from alcoholic hydroxyl groups and amino groups, or a partial reaction product formed from said polyamideimide precursor and said polyfunctional compound, (ii) an organic solvent in an amount at least sufficient for dissolving said mixture or partial reaction product completely therein, and (iii) a hardening catalyst.

17. The wire-enamelling composition of claim 16, wherein the organic solvent is a phenol-type solvent consisting essentially of cresol or a mixture of said phenol-type solvent with an aromatic hydrocarbon solvent consisting essentially of xylene.

18. An insulated electric wire which comprises an electrically conductive wire and an electrically insulating coating formed on the wire, said coating being composed of a hardened polymer formed by reacting the polyamideimide precursor of claim 1 with a polyfunctional compound containing in the molecule at least two reactive groups selected from alcoholic hydroxyl groups and amino groups.

19. The composition of claim 1 in which Z is phenyl.
20. The composition of claim 1 in which Z is cresyl.
21. The composition of claim 1 in which Z is xylenyl.

References Cited

UNITED STATES PATENTS

| | | | |
|---|---|---|---|
| 3,555,113 | 1/1971 | Sattler | 260—841 |
| 3,696,077 | 10/1972 | Suzuki | 260—78 TF |
| 3,652,498 | 4/1972 | Morello | 260—47 CP |
| 3,578,639 | 5/1971 | Sheffer | 260—77.5 |
| 3,697,484 | 10/1972 | Zeiber | 260—77.5 R |
| 3,625,911 | 12/1971 | Redman | 260—30.2 |

ALLAN LIEBERMAN, Primary Examiner

R. ZAITLEN, Assistant Examiner

U.S. Cl. X.R.

260—33.4 P, 33.6 R, 47 CZ, 78 TF